US008346624B2

(12) United States Patent
Goad et al.

(10) Patent No.: US 8,346,624 B2
(45) Date of Patent: Jan. 1, 2013

(54) SYSTEMS AND METHODS FOR RECOMMENDING THIRD PARTY PRODUCTS AND SERVICES

(75) Inventors: Glenn R. Goad, Cumming, GA (US); David Norman Martin, Atlanta, GA (US); Ravi Trivedi, Morrisville, NC (US)

(73) Assignee: Allconnect, Inc., Atlanta, GA (US)

(*) Notice: Subject to any disclaimer, the term of this patent is extended or adjusted under 35 U.S.C. 154(b) by 108 days.

(21) Appl. No.: 12/634,345

(22) Filed: Dec. 9, 2009

(65) Prior Publication Data
US 2011/0137818 A1 Jun. 9, 2011

(51) Int. Cl.
G06Q 30/00 (2006.01)
(52) U.S. Cl. ............. 705/26.7; 705/26.1; 705/27.1
(58) Field of Classification Search ........ 705/26, 705/27
See application file for complete search history.

(56) References Cited

U.S. PATENT DOCUMENTS

| | | | |
|---|---|---|---|
| 6,012,051 A | 1/2000 | Sammon, Jr. et al. | |
| 6,965,872 B1 | 11/2005 | Grdina | |
| 6,985,939 B2 | 1/2006 | Fletcher et al. | |
| 7,076,447 B1 | 7/2006 | Peyser et al. | |
| 7,287,002 B1 | 10/2007 | Asher et al. | |
| 7,302,429 B1* | 11/2007 | Wanker | 1/1 |
| 7,430,531 B1 | 9/2008 | Snyder | |
| 2001/0044743 A1 | 11/2001 | McKinley et al. | |
| 2002/0116282 A1 | 8/2002 | Martin et al. | |
| 2004/0015405 A1 | 1/2004 | Cloutier et al. | |
| 2004/0064379 A1 | 4/2004 | Anderson et al. | |
| 2004/0221305 A1 | 11/2004 | Broussard et al. | |
| 2005/0114155 A1 | 5/2005 | Hodges et al. | |
| 2006/0282304 A1* | 12/2006 | Bedard et al. | 705/10 |
| 2008/0262897 A1 | 10/2008 | Howarter et al. | |
| 2008/0270224 A1 | 10/2008 | Portman et al. | |

OTHER PUBLICATIONS

Allconnect: Internet Archive Wayback Machine, www.archive.org; Allconnect website www.allconnect.com; Oct. 2008, 30 pgs.*

* cited by examiner

*Primary Examiner* — Robert M. Pond
(74) *Attorney, Agent, or Firm* — Morris, Manning & Martin, LLP; John R. Harris, Esq.; Daniel E. Sineway, Esq.

(57) ABSTRACT

Systems and methods for recommending third party products and services. The method includes the steps of ranking the third party products and services based on one or more factors, and generating a user profile based on one or more user-related factors. Next, the method determined appropriate third party products and services based on the user's geographical location and filters the third party products and services based on the user profile and the user's geographical location. These filtered results are dynamically ranked based on the user profile, and personalization of the third party products and services. Finally, the method provides the ranked results pertinent to the end user's preferences, and the geographical location.

31 Claims, 19 Drawing Sheets

EXEMPLARY RECOMMENDATION PROCESS

OVERVIEW OF ORDER FACILITATION AND RECOMMENDATION SYSTEM

EXEMPLARY ORDER FACILITATION AND RECOMMENDATION PROCESS

EXEMPLARY LOG-IN SCREEN

EXEMPLARY LOCATION IDENTIFICATION SCREEN

EXEMPLARY LISTING OF PRODUCTS OR SERVICES AVAILABLE AT A GIVEN LOCATION

EXEMPLARY RANKED LIST OF PRODUCTS OR SERVICES

TELCO SERVICE PLANS AVAILABLE AT ADDRESS-B

| SELECTION | SERVICE PROVIDER | SERVICE PLAN | MONTHLY PRICE | # PACKAGE FEATURES | PROMOTION |
|---|---|---|---|---|---|
| ☐ | TelCo | COMPLETE CHOICE W.... | $54.99 | 15 | SEE INFO PLAN |
| ☐ | TelCo | COMPLETE CHOICE - ... | $30.00 | 15 | SEE INFO PLAN |
| ☒ | TelCo | PREFERRED PACK W/U... | $47.99 | 5 | SEE INFO PLAN |
| ☐ | TelCo | PREFERRED PACK - NC | $26.00 | 5 | SEE INFO PLAN |
| ☐ | TelCo | UNLIMITED CALLING - ... | $16.75 | 0 | SEE INFO PLAN |
| ☐ | TelCo | AS IS | TRANSFER | N/A | N/A |

FIG. 7

EXEMPLARY LIST OF PRODUCT OR SERVICE PLANS

PROVIDER INTEGRATION PAGE

DO YOU CURRENTLY HAVE A LOCAL PHONE SERVICE IN YOUR NAME? ⦿ Yes ○ No

WHO IS YOUR CURRENT LOCAL PHONE SERVICE PROVIDER? [▼]

DO WE HAVE PERMISSION TO ACCESS YOUR RECORDS? ⦿ Yes ○ No

WHAT IS YOUR CURRENT PHONE NUMBER? [          ]

FIG. 8

EXEMPLARY PROVIDER INTEGRATION PAGE

*← 900*

Order Summary

[33349750] LOCAL Telco PREFERRED PACK

RECAPPED ORDER ITEMS

COST SUMMARY
TOTAL INSTALL COST      $42.75
TOTAL MONTHLY COST      $29.00

RECAP TEXT THERE IS AN ADDITIONAL FCC CHARGE OF $6.50 ON THE MAIN LINE AND $7.00 ON ADDITIONAL LINES. OTHER STATE AND LOCAL TAXES MAY APPLY

RECAPPED PLAN ATTRIBUTES

PLAN ATTRIBUTES
BASE MONTHLY PRICE      $26.00
SET UP FEE – 1$^{ST}$ LINE      $42.75

| | |
|---|---|
| PLAN OPTIONS CALL WAITING DELUXE | INCLUDED |
| CALLER ID W/NAME AND NUMBER | INCLUDED |
| PRIVACY SERVICE | INCLUDED |
| THREE WAY CALLING | INCLUDED |
| CALL RETURN/AUTO CALL RETURN | INCLUDED |

*FIG. 9*

EXEMPLARY ORDER SUMMARY PAGE

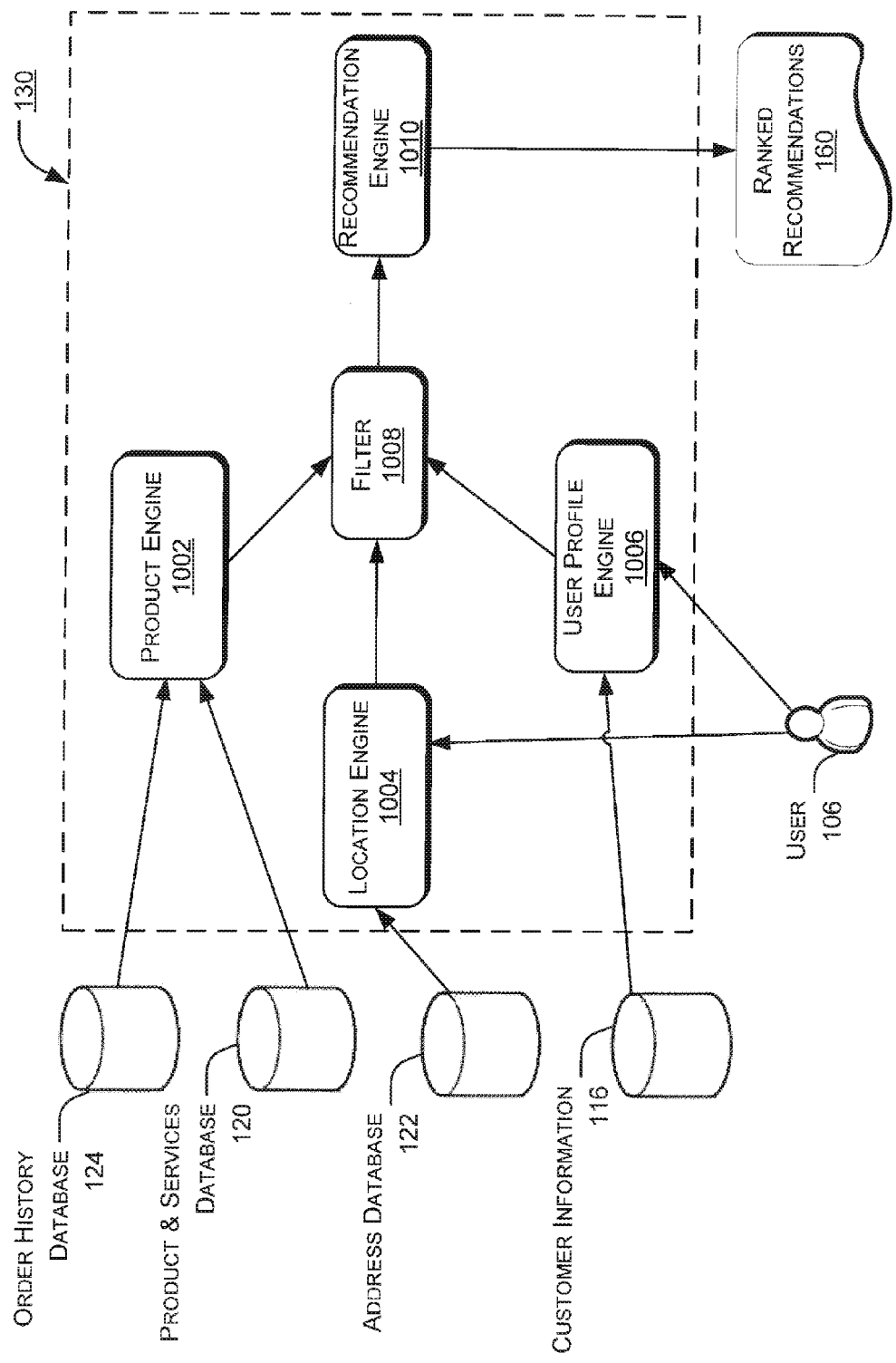

EXEMPLARY PRODUCTS AND SERVICES DATABASE SCHEMA

EXEMPLARY ORDER HISTORY DATABASE SCHEMA

EXEMPLARY PRODUCT ENGINE MODULES

EXEMPLARY USER INFORMATION DATABASE SCHEMA

EXEMPLARY USER PROFILE ENGINE MODULES

EXEMPLARY ADDRESS DATABASE SCHEMA

EXEMPLARY LOCATION ENGINE MODULES

EXEMPLARY RECOMMENDATION PROCESS

EXEMPLARY PRODUCT AND SERVICE RANKING PROCESS

EXEMPLARY USER PROFILE GENERATION PROCESS

EXEMPLARY LOCATION CLASSIFICATION PROCESS

SYSTEMS AND METHODS FOR RECOMMENDING THIRD PARTY PRODUCTS AND SERVICES

TECHNICAL FIELD

The present application relates generally to acquisition of products and services, and more particularly to electronic-ranking and acquisition of products and services provided by third parties via an order facilitation service.

BACKGROUND

Residents of any property relocate or move from time to time. Such relocations may involve worldwide, interstate, intrastate, or local moves. Regardless of the geographical bounds of the move, upon relocating tenants frequently engage in a substantial effort to acquire utilities and other services such as Internet service, electricity, television services, telephone services, and other similar products and services. Further, even if a resident is not relocating, he or she may want to change his or her service provider for a given service, disconnect a service her or she is not satisfied with, or simply acquire a new service from time to time.

Often, residents are unaware of all the services and products available at their current or future addresses, the price plans associated with those products and services, and so on. The residents may ask helpful neighbors about available services, contact individual service providers, or conduct extensive research (e.g., online) to select the most suitable product or service provider. Such research is often tedious and time-consuming. Further, if the resident wishes to acquire more than one service, he or she must contact each service provider individually, which typically involves numerous phone calls, and lengthy interviews with customer service representatives. Furthermore, there is no easy way to shop and compare such goods and services, and at the same time be able to automatically and immediately place orders with a selected service provider, from one common place. A resident may have to contact numerous service providers individually, take notes, compare prices, and finally call back the selected provider and place an order once the best product or service has been identified for the resident's needs.

Additionally, even if a resident conducts extensive research to identify what are believed to be the best product or services for the particular resident, there is no guarantee that the most optimal products or services are in fact identified for the particular resident's needs. For example, the resident may believe he or she has located the cheapest television service in his or her geographic area, but there could be other cheaper services of which the resident is totally unaware. Currently, there is simply no service that assists users in identifying and selecting optimal products and/or services available to the user's address based on user preferences, product and service information, popularity of product or service information, etc.

Therefore, there is a long-felt but unresolved need for a system or method that interacts with a user to combine and analyze various sources of disparate information relating to third party products and services offered to a user's address or geographic location, and suggest optimal products or services to the user based on the collected information to enable the user to select the most appropriate product(s) or service(s) that fit his or her needs. There is a further need for a system or method that assists product and service providers in identifying the most desired and most profitable products and services offered to consumers.

BRIEF SUMMARY

Briefly described, and according to one embodiment, the present disclosure describes a computer-implemented method for providing recommendations to a user for a number of third party products and services. Initially, the third party products and service are ranked based on one or more factors, and a user profile is generated based on one or more user-related factors. Next, appropriate third party products and services are determined based on the user's geographical location, and those appropriate third party products and services are filtered based on the user profile and the user's geographical location. These filtered results are dynamically ranked based on the user profile, and a personalization of the third party products and services. Finally, the method provides the ranked results pertinent to the end user's preferences, and the geographical location.

Another embodiment of the present disclosure presents a system for providing recommendations to a user for a number of third party products and services. The system includes a product-ranking engine for ranking the third party products and services based on one or more factors, and a profile engine for generating a user profile based on one or more user related factors. Further, a location engine sorts the third party products and services based on the geographical location of the user, while a filtering engine filters the third party products and services based on the user profile, and the geographical location of the user. The system further includes a recommendation-ranking engine for dynamically ranking the filtered third party products and services based on the user profile, and the personalization of the third party products and services, and an output engine for providing the user with a list of ranked third party products and services pertinent to the end user's preferences, and the geographical location.

Certain embodiments of the disclosure may provide various technical advantages. For example, certain embodiments may allow users to make an intelligent decision based on one or more parameters associated with the product, with their lifestyle, financial position, and their address. Further, other embodiments of the system may allow the service providers to improve their sales based on product and service rankings, user preferences, and user requirements.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment. The drawings are illustrative in nature and are not necessarily drawn to scale.

FIG. 7 illustrates an exemplary list of available service plans at a geographical location.

FIG. 8 illustrates an exemplary provider integration page.

FIG. 9 illustrates an exemplary purchase order summary report.

FIG. 10 is a block diagram illustrating an exemplary system for recommending third parry products and services to end users.

DETAILED DESCRIPTION

Figure 1:
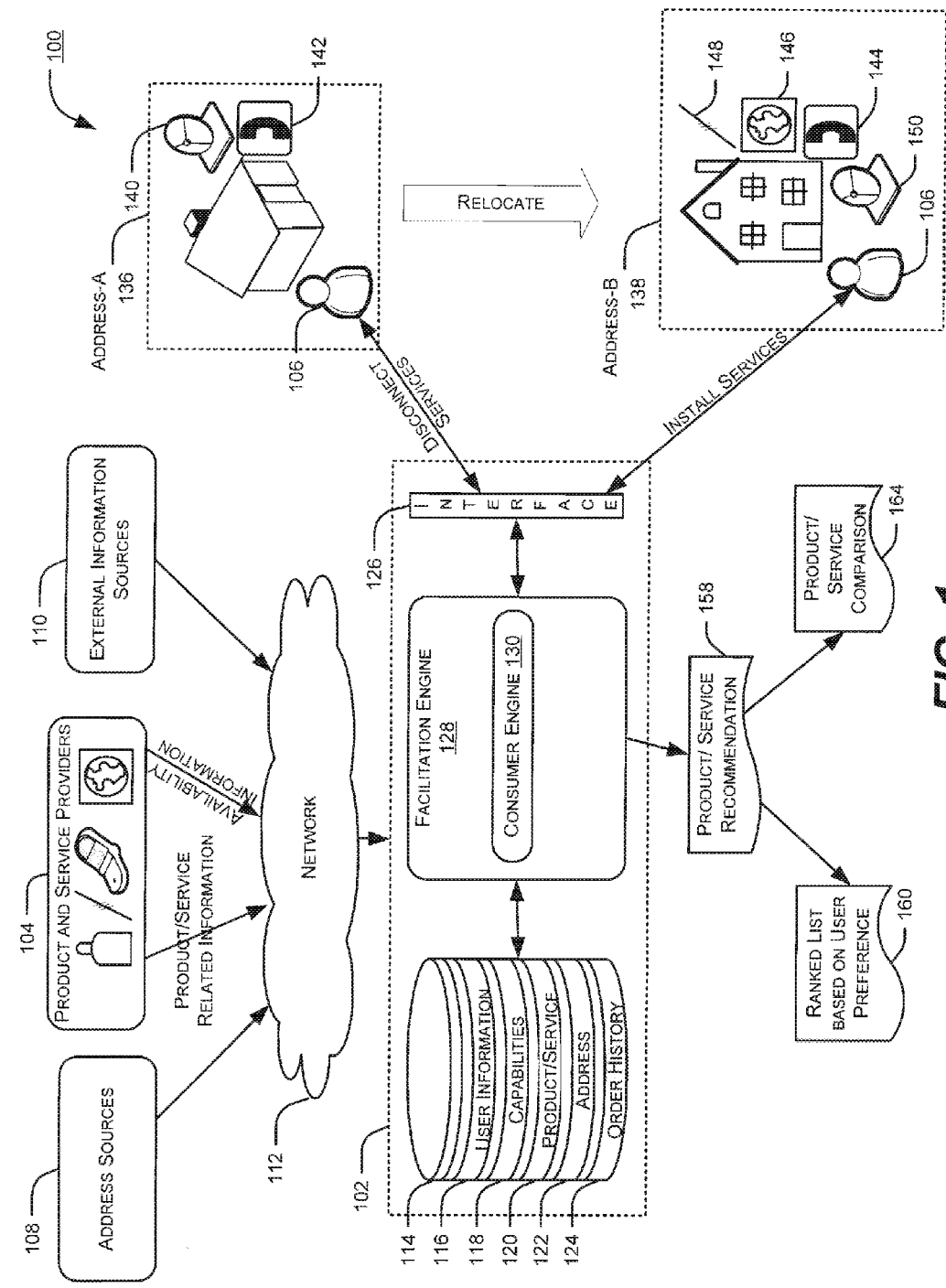
FIG. 1 is a block diagram illustrating an exemplary system for electronic acquisition of products and services provided by an order facilitation service.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

System Overview

Embodiments of the present disclosure generally relate to aspects of an electronic (e.g., Internet-accessible) system (e.g., an order facilitation service) that facilitates acquisition of geographically-determined third party products and services to consumers. According to one embodiment, the system includes operative connections to a plurality of product and service providers, and coordinates and offers products and services of those product and service providers to users of the system. For example, if a user relocates his or her residence from Dallas to Atlanta, the user can access the electronic system (e.g., via the Internet, or via a phone call to a call center, which accesses the electronic system) to arrange for disconnection of existing residential or business services such as telephone, cable TV, satellite TV, Internet, trash pickup, security, electricity, gas, pest control, other utilities, and so on, and reconnection of similar services in Atlanta. Or, if a user simply wishes to add a new product or service to his or her existing location, or change an existing service, he or she can do so via the electronic order facilitation system. In this way, a user is able to transfer existing products and services, order new products and services, or cancel products and services offered by a plurality of different product and service providers from one central facilitation system.

Further, according to one aspect, the electronic order facilitation system receives data from a variety of different sources (e.g., publicly-available census data, product and service data provided by product and service providers, stored data based on previous user orders, etc.), and analyzes that data according to predetermined rules, factors, etc., to provide a user with a ranked list of suggested or optimal product and service offerings that are tailored to the specific user's needs and preferences (described in greater detail below). According to one aspect, the system automatically selects the most optimal or appropriate (e.g., highest ranked) product or service for each product or service type of which the user is interested, and suggests or automatically populates a user's order with the selected products or services.

According to an additional aspect, over time as users order numerous products and services via the electronic system, the system stores information relating to those orders, and subsequently provides that order history information to third party product and service providers for further use. Specifically, and for example, the electronic service may provide order history information, user preference information, product or service rankings, popularity information of certain products or services, and other similar types of information to the third party service providers, enabling the providers to analyze their products and services based on the received information to improve the quality of their products and services, sales, and profit margins. For example, in one geographical location such as Atlanta, the electronic system may determine that most users prefer Telco's Internet service because of the cost benefits offered and because Telco provides excellent customer support service. Other Internet service providers can analyze Telco's service plans along with their own service plans to optimize their plans for better customer satisfaction, and in turn higher sales.

Turning now to the figures, FIG. 1 illustrates an embodiment of an electronic system 100 for providing and recommending third party products and services to users (i.e., an order facilitation and recommendation service), as described in detail herein. As shown, the system 100 includes a computing system 102 operatively coupled to one or more third party product and service provider(s) 104, user(s) 106, address or location source(s) 108, and other external information source(s) 110 through a network (e.g., Internet) 112. Although not specifically shown, it will be understood by one of ordinary skill in the art that, according to one embodiment, users 106 access the electronic system 102 via the network 112, or via a call center, etc. For purposes of the present disclosure, the term "user" is generally synonymous with "customer" or "consumer".

As shown, the computing system 102 maintains one or more database(s) 114 that store information from the sources 104-110. The databases 114 may include a customer (or user) information database 116, a capabilities database 118, a products and services database 120, an address database 122, and an order history database 124. Generally, the computing system 102 retrieves information from the sources 104-110 and populates the retrieved information in the databases, based on system requirements. As will be understood, these databases may be updated in real time or on an intermittent basis. As will be further understood, the specific databases shown and described and intended to be illustrative only, and actual embodiments of the present system include various database structures, schemas, etc.

Depending on the particular embodiment, the network 112 may be the Internet, providing interaction capabilities between the various sources and the computing system 102, a private network (such as a VPN), a PSTN system (providing call center capabilities), a mobile network, or a combination of these networks. For example, the computing system 102 can have both Internet connectivity, as well as call center capabilities to service users. Some users may prefer to use the Internet for service acquisition, while other users, who may not be as adept or familiar with the Internet, may prefer to use the call center facility (not shown). According to one embodiment, the call center employs customer service representatives (CSRs) that interact with the user, obtain information from the user, and provide information (e.g., suggested products and services) to the user to obtain the requested products and services.

The customer information database 116 generally includes information pertaining to each user 106, such as user identification number, preferences and details associated with that user, the user's purchase history of products and services ordered through the computing system 102, current, future, and previous address information (if available), financial information (e.g., credit history), and other similar types of information. This information may be retrieved from a variety of sources, such as the user 106, previously-stored information in the computing system 102, financial institutions, publicly-available data sources, or other information sources known in the art. For example, a user's purchase history can be retrieved from the computing system 102 every time an order is placed via the order history database 124. Financial information, on the other hand, may be obtained from either the user 106, or some financial institutions. It will be understood that other information sources may also be used to obtain user related information—for example, census information can be utilized to gather information such as the number of family members of the user, family income, and other user-related information.

The address database 122 may include extensive information about each user's address or addresses, or all of the physical addresses in a given geographic area. The information relating to the addresses stored in the address database 122 may include address characteristics (such as whether the location is a business address or a household, an apartment or a home, etc.), the size of the residence, the floor plan, the number of rooms, the size of a lot, or other similar information. This information may be retrieved from the users 106 or the address source(s) 108, such as real estate sources, city plans blueprints, census data, city authorities, or any other known sources.

Similarly, information pertaining to the third party products and services is stored in the products and services database 120. This information may be directly retrieved from the third party product and service providers 104 or from other external sources 110. For example, the products and services database 120 may include information about the products and services offered (e.g., prices of plans, plan specifics, features, etc.), geographical areas serviced, special offers or promotions from the service providers 104, and other similar information. Further, information such as product or service popularity, user ratings, order history of each product or service, product reviews, etc., may be stored in the products and services database 120, or may be retrieved from other external sources 110 or other system databases (e.g., the order history database 124) that store details of orders made through an embodiment of the computing system 102.

Still referring to FIG. 1, the capabilities database 118 uses information from the products and services database 120, the address database 122, the service providers 104, and the users 106 to build a cross-referenced database of various capabilities required for different products and services stored in the products and services database 120, and their potential for availability at the addresses in the address database 122. For example, if a certain Internet provider provides a DSL connection, then us an entry for that service provider, the capabilities database 118 may store a "cable connection required" identifier. As a further example, if capability information is available for an address, the capabilities database 118 maintains a list of capabilities corresponding to that address, such as "telephone connection present", or "no gas connection". Or, certain products or services may not be available in certain areas, and thus the capabilities information for those products and services will indicate that those products and services cannot be ordered for those areas. Thus, each product or service, user address, etc., may be associated with predetermine rules or criteria that dictate an availability for a given product or service in a particular area or for a particular address The capabilities information stored in the capabilities database 118 is useful to determine the most appropriate product or service for a user 106. For example, if a user's household already includes a telephone connection, it may be advisable to select an Internet service provider that provides telephone cable connection, rather than a service provider that provides only LAN-based connections. This capabilities information may be retrieved from address sources 108, service providers 104, from the users 106 directly, or from other sources as will occur to one of ordinary skill in the art.

Still referring to FIG. 1, in addition to the databases, one embodiment of the computing system 102 includes a user interface 126 and a facilitation module 128. Generally, the user interface 126 allows users 106 to access the computing system 102, input information and details into the system regarding the user or the user's address (e.g., user preferences, address information, a customer identification number, etc.), and request, review and order products and services. For example, if a user 106 desires to acquire an electricity connection at his or her home, the user interface 126 may display an ordered list of electricity connection providers, along with their plans, based on analysis of disparate information (described in greater detail below). According to one embodiment, rather than the user accessing the user interface 126 via the network 112, the user may contact a call center and a customer representative may assist the user in ordering various products and services (e.g., a user interface may be displayed to the call center representative). Example screen shots illustrating various user interface screens are shown in FIGS. 3-9.

The facilitation module 128 includes an algorithm or other system components that enables a user to review, transfer, cancel or purchase third party products and services. Generally, the facilitation module interacts with databases 114 and other information sources (described herein and as will occur to one of ordinary skill in the art) to identify third party products and services available to a given user based on the user's location, and enable a user to select and order such products and services directly (i.e., without having to contact the third party product and service providers individually).

Additionally, in one embodiment, the facilitation module 128 includes a consumer engine 130 that recommends the most suitable products and services and/or service providers 104 to the users 106 based on user preferences, profitability goals, popularity of products or services, etc. Specifically, the consumer engine 110 generates an ordered list of products or services based on user preferences, user location, user information, product and service information, etc., by performing extensive analysis and calculations on this and other information from the customer information database 116, the capabilities database 118, the products and services database 120, the address database 122, the order history database 124, and other information sources. The ordered or ranked list is intended to represents products or services that a given user is most inclined to purchase or most fits the user's needs. The details associated with the consumer engine 130 and its functionality are described in greater detail below.

Additionally, as will be understood, the facilitation module 128 includes other engines, modules, and functionalily not described herein as will occur to one of ordinary skill in the art. Further, the electronic system 100 is not intended to be limited by the specific information sources, databases, engines, and other components shown and described herein. As will be understood and appreciated, the architecture of the system 100 may vary as will occur so one of ordinary skill in the art.

Figure 2:
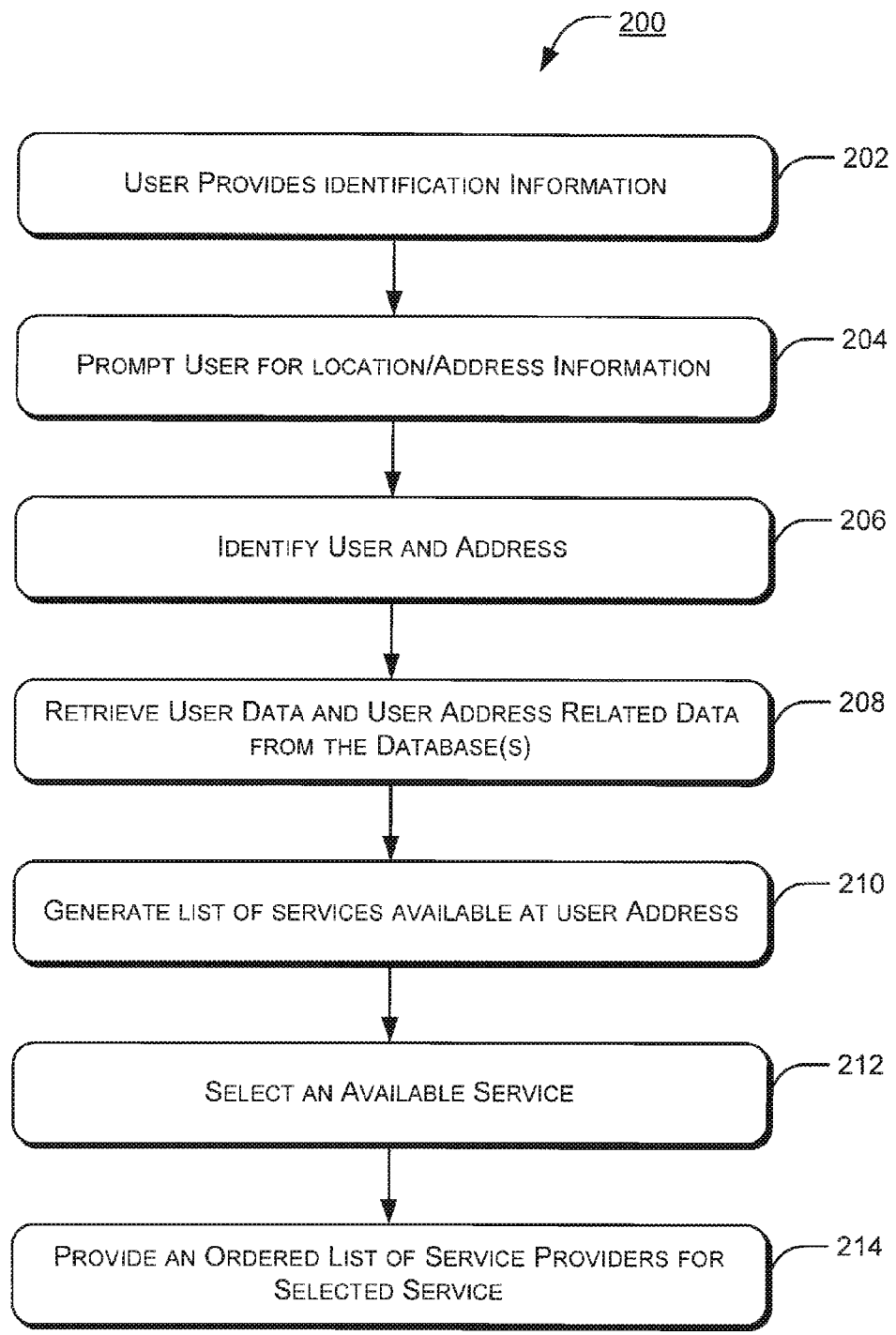
FIG. 2 is a flowchart illustrating an exemplary method for electronic acquisition of products and services provided by an order facilitation service.

FIG. 2 illustrates an exemplary, high-level order facilitation and recommendation process 200 according to one embodiment of the present system 102. For the exemplary process, it is assumed that a user, such as user 106 associated with address-A 136 (see FIG. 1), relocates from address-A to address-B 138. Although, as will be understood and appreciated, no relocation is required in order to utilize aspects of the present system 102. At address-A 136, the user 106 had a satellite television connection 140, and a telephone connection 142, which the user wishes to disconnect or transfer to his or her new address. As shown at the new address (address-B 138), the user wishes to transfer the satellite 150 and telephone 144 services (potentially to new service providers with new service plans), and install new services such as a an Internet connection 146 and electricity 148. As described previously, a user may or may not know which products or services he or she wishes to install at his or her new residence, and thus the order facilitation and recommendation process 200 carried out by the facilitation module 128 assists the user in selecting and ordering such products and services.

Figure 3:
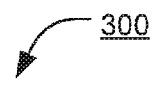
FIG. 3 illustrates an exemplary user identification screen.
Figure 4:
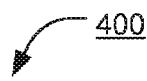
FIG. 4 illustrates an exemplary user information retrieval screen.

To this end, and referring to FIG. 2, at step 202, the user 106 accesses the computing system 102 via the network 112 and the user interface 126, and provides identification details to gain access the computing system 102. FIG. 3 illustrates an exemplary "log-in" or user identification screen, which requests user information. The user interface 126 (e.g., FIG. 3) may have drop down menus, service buttons, or may require the user 106 to type in a query or response. Upon authorization, the user 106 is prompted for location information for the address at which a product or service is requested (step 204) (see FIG. 4). In some cases, if the user 106 is a regular customer, the user's information may be up-to-date in the databases, and the user 106 may not be required to enter any information into the address screen (step 206). Alternatively, the user interface 126 may display the user's last saved address along with other details and prompt the user to verify these details.

After the system 102 has identified the particular user and address of the user, at step 208, the facilitation module 128 retrieves data from one or more databases 114 to determine products and services available to the user. In some cases, the retrieved information may be filtered before any analysis. For example, if the user 106 requires information about Internet, phone service, electricity, and cable services, information pertaining to service providers 104 that do not provide these services may be discarded. The retrieved product and service information may be further filtered by the user's address. If any service is not available at the user's address, information pertaining to that service can also be discarded. It will be understood that various other filters may be applied to the data based on user inputs, or preferences, without departing from the scope of the present disclosure.

Figure 5:
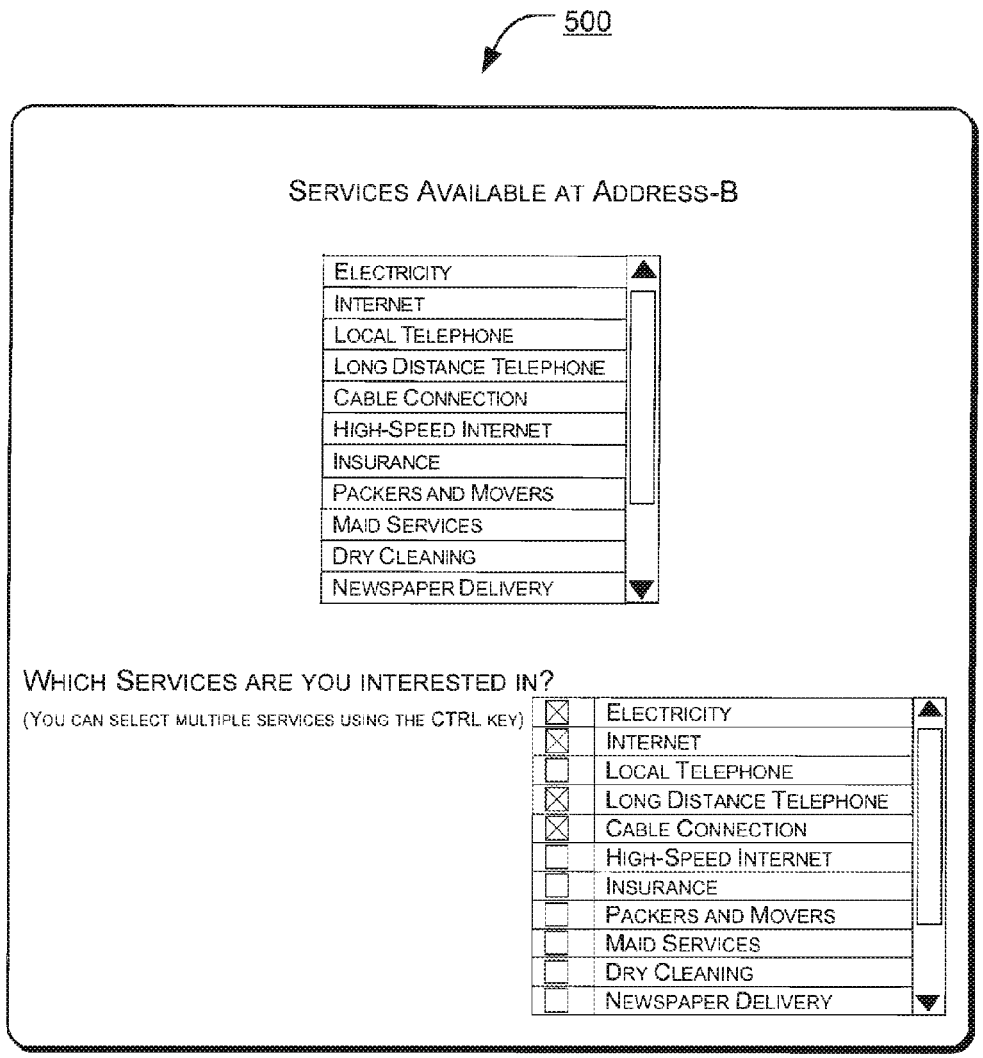
FIG. 5 illustrates an exemplary listing of products and services available at a given address.

To install new products or services, the user 106 may want to know of all the services available at the new address (e.g., address-B 138), and the most appropriate services from the available list. At step 210, the facilitation module 128 generates a list of available products and services at address-B 138 based on the information retrieved during step 208. FIG. 5 illustrates an exemplary screen shot listing product and service types available at a given address. As shown, the user is able to select types of products or services in which the user is interested (step 212).

Figure 6:
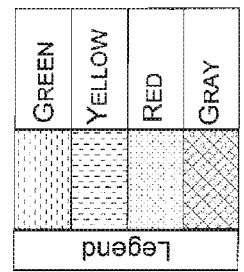
FIG. 6 is a screenshot of an exemplary list of ordered recommendations.

According to one embodiment, rather than simply presenting a list of all available products and services to a user, the facilitation module 128 (specifically, the consumer engine 130) analyzes various retrieved information, along with the user's preferences to provide analyzed results to the user 106 via the user interface 126 (step 214). Specifically, based on the user's preferences and address-B 138 capabilities, the consumer engine 130 recommends products or services 158 to the user 106. These recommended products or services are intended to meet a desired objective (e.g., best suited for user's needs, most profitable services, etc). The results may include a ranked list 160 of service providers, or product and service plans based on user preferences and ranking factors, a comparison report 164 of different providers or products: and other similar results (described in greater detail below). FIG. 6 illustrates an exemplary ranked list 160 of products and services. Here, for each user preference service, the consumer engine 128 provides an ordered list. Based on these recommendations, the user 106 can make an educated decision regarding which service he or she wishes to purchase. Moreover, the user 106 does not have to visit multiple service providers 104, provide personal details to each vendor separately, or compare prices manually as the electronic system 100 aids the user 106 in all decisions pertaining to utility services or products. Details associated with ranking and suggesting particular products or services are described in greater detail below.

According to an alternate embodiment, rather than providing a ranked list of suggested products or services, the facilitation module 128 simply presents all products or services (e.g., of a given type, or offered by a particular provider) to the user. For example, as shown in FIG. 7, all services potentially available at address-B 138 offered by Telco are shown.

In one embodiment, if the user 106 selects any service or product from either the ranked list or unranked list, such as a telephone service, the computing system 102 may interact directly with the service provider 104 that offers that service, in real time, to access particular user information, plan information, or service information. FIG. 8 illustrates an exemplary user interface pop-up screen requesting details from the user. Here, the user may be asked questions relating to current phone services used. Further, the computing system 102 may request the user's permission to access his or her records from his or her current phone service provider.

Additionally, if the user 106 selects a particular product or service plan from the list of available plans (e.g., from the Telco plans shown in FIG. 7, or the ranked cable service plans shown in FIG. 6), then the computing system 102 may update user or service information via the service provider's web portal. For example, if the user 106 wishes to modify a local telephone plan with Telco, the computing system 102 may directly connect to the TELCO website, login, change the user's service plan, make payments, and update the user's connection plan. Further, if the user requests an additional phone line, the system can request installation services with the Telco website. In this manner, the computing system can efficiently interact with all the service providers 104, request installations, disconnections, or upgrades, in real time, in effect reducing or eliminating user interaction with individual service providers.

Alternatively, the computing system 102 may receive the user's selection of a plan and store this information. Later, the computing system 102 may retrieve this information and provide an update to the associated service provider 104 with the user's selection. This update may be carried out through the Internet, via a phone call to a representative of the service provider, via a third party agent, or through any other communication method. Once the user's order is confirmed, the user interface 126 may provide a summary of the products or services ordered. FIG. 9 illustrates an exemplary table 900 indicating the user's acquisition summary. This information is stored in the customer information database 116 and the order history database 124 for future recommendations to the same or other users.

Having described the general functionality of an embodiment of the computer system 102, facilitation module 128, and other related components, a detailed description of an embodiment of the consumer engine 130 is described in detail below.

Exemplary Consumer Engine

Generally, the consumer engine 130 comprises an enterprise-wide framework for offering and recommending optimal third party products and services to a user 106 based on a series of parameters related to product characteristics, user demographics, dwelling characteristics, financial implications, user preferences, and other similar parameters. In a basic illustrative example, if a user preference is for a gas utility connection, and the user 106 resides in New York, the consumer engine 130 can perform calculations on the data retrieved from the databases 114, and input by the user 106, to generate an ordered list of gas service providers in New York. As will be understood and appreciated, the products and services may be ranked based on a variety of factors and information, as described herein and as will occur to one of ordinary skill in the art. For example, the list of products and services may be ordered based on one or more parameters such as popularity of each product or service, specific details of each product or service (e.g., price), offers or promotions associated with each product or service, the user's financial position and credit history, the user's previous product or service providers, previous user address, home capabilities, capabilities required for the service, and other pertinent parameters. In one embodiment, products and services that achieve a certain recommendation score may be highly suggested to users, whereas others may only be moderately suggested, or not suggested at all. By presenting intelligent recommendations and personalizing offerings to consumers, the consumer engine 130 can provide an optimal and personalized experience to consumers.

FIG. 10 is a block diagram illustrating an exemplary consumer engine 130 with associated databases. In the embodiment shown, the consumer engine 130 comprises a product engine 1002, a location engine 1004, a user profile engine 1006, a filter 1008, and a recommendation engine 1010. As shown, inputs to the consumer engine 130 include information in the order history database 124, the products and services database 120, the address database 122, and the customer information database 116. Generally, the consumer engine 130 utilizes all of the engines and data inputs shown in FIG. 10 to determine and identity the optimal products and services for each particular customer. As will be understood and as mentioned previously, however, the consumer engine architecture shown in FIG. 10 is but one embodiment of the consumer engine, and is not intended to limit particular databases, engines, modules, other components used in other embodiments.

Generally, the product engine 1002 ranks products or services offered by service providers 104 based on data retrieved from the products and services database 120 and the order history database 124. The data may include several factors such as specific information about each product or service (e.g., price, features, provider, etc.), past financial characteristics of each product or service provider offering the product or service, revenue per order associated with each product, profit margins, consumer experience, sales or promotions offered, product ratings, user reviews, popularity growth in a region for a product, and so on.

Ranking products or services facilitates optimization for sale of products or services. Further, the product engine 1002 optimises product mix by recommending products that are more favorable to all constituents—end users, partners, and the enterprise. This optimization helps maximize sales yield and improve consumer experience.

Ranking products across different service providers 104 also helps create a true home services marketplace focused on the end user. Utility service providers can view the product's position in the marketplace and optimize their products by altering key drivers such as promotions, user experience, and installation rates to increase the appeal of their products or services. This mechanism effectively creates a marketplace for the service providers 104, and can lead to a feedback loop that would improve the consumer experience and profitability for the service providers 104. Further details of the product engine 1002 are described below in conjunction with FIG. 13.

Still referring to FIG. 10, one embodiment of the user profile engine 1006 classifies users into one or more categories based on external and internal parameters such as demographic data, purchase history, credit scores, and other similar parameters. Depending on the particular embodiment, the user profile engine 1006 can be configured to profile users into address-based categories, financial status-based categories, or based on their purchase history. Other categorizations can also be contemplated and will not be outside the scope of the present disclosure.

This user classification determined by the user profile engine 1006 can be used to identify the most appropriate products or services for a given user. For example, if a user is in an "affluent" class (based on the user's credit score, purchase history, etc.), then it may be determined that the user may be more interested in higher-end products or services.

Thus, lower-end products or services may not be presented to the user (or may be presented further down a ranked list as "not recommended", etc.).

In addition to presenting the most appropriate products or services to a user, the output of the user profile engine 1006 can also be used to handle other situations such as managing call overflow in customer support centers (e.g., call center) for the order facilitation service 100. For example, in an overflow situation in which the facilitation service is experiencing a high volume of customer calls, high value customers can be directed to a qualified agent, medium value customers, to an interactive voice response (IVR) service (which can qualify their interest in certain products or services), and low value customers can be placed on hold. User segmentation and filtering can also be performed based on the output of the user profile engine 1006, where calls from a particular location (e.g., zip code) are forwarded to product specialists depending on product availability. For example, a call from a non-cable zip code can be forwarded to a satellite TV agent. Another advantage of profiling users is to match users to specific agent types to gain maximum yield. For example, high profile customers can be directed to high-performing agents, medium profile customers to average-performing agents, and low profile customers to low-performing recruits. Further details of the user profile engine 1006 are described below in conjunction with FIG. 15.

Still referring to FIG. 10, the location engine 1004 uses address information from the address database 122 to understand the characteristics of a user's residence or location and which services are available at that address to personalize and offer relevant products or services to the user based on the user's residence. Attributes of the address (or residence at the address) such as size, type, number of rooms, year built, and lot size can be used to determine which products best meet the customer's needs. For example, home warranty products can be offered to users who live in older homes instead of users that live in relatively newer homes, as it would be expected that older homes may experience more problems. Further, understanding the relative home size combined with the general neighborhood crime rates can help determine whether home security related products or services would appeal to a certain user. Offering tailored products and services helps the consumer obtain the most appropriate products or services, build trust, increase sales probability for the facilitation service 100 and the product and service providers 104, and reduce handle time and other costs that in turn result in optimal user experience. Obtaining additional information about previous products connected in the user's home from different service providers 104 can also be used to offer the most appropriate solutions. As a specific example, if prior wiring of a home for home security is known, the personalization engine 1004 can recommend a home security product to the new user based on reduced installation costs and logistical overhead. Further details of the location engine 1004 are described below in conjunction with FIG. 17.

According to one embodiment of the present system, the filter module 1008 is composed of one or more rules and policies for filtering the results of the product engine 1002, location engine 1004, and user profile engine 1006, using a number of parameters. For example, user preference can be one parameter to filter the results generated by the product engine 1002. Alternatively, user address may be a second parameter to filter products and services. As an additional example, although the product engine 1002 indicated that a certain product was the most optimal for a given customer based on the customer's needs, that product may not be available at the customer's residence, and thus the filter 1008 will remove that product from the ranked list of products. As a yet further example, certain products or services may be removed from a ranked list based on user profile information (e.g., a low-value customer may be presented with less-costly product and service options). It will be understood that the filter can include parameters that can be applied on the input data separately or in combination to achieve a desired result. Examples of parameters include house size, house capabilities, capabilities required by the product or service, and user financial status. The functionality of the filter module 1008 is described in greater detail below.

Still referring to FIG. 10, an embodiment of the recommendation engine 1010 produces a ranked list of products and services, such as the ranked list 160 based on the output of the product engine 1002, the user profile engine 1006, and the personalization engine 1004. The results can be displayed to the user as an ordered list or table, pie charts, graphs, or using color-coded schemes. An exemplary ranked list is shown in FIG. 6, described previously. In a customer support scenario, an agent can provide the results to the user orally, along with system recommendations. For example, the ranked list shown in FIG. 6 includes colors of "green", "yellow", "red", and "grey" for each ranked product or service. A "green" color may indicate a product or service that is highly recommended for that particular user, a "yellow" may indicate a product or service that is only moderately-recommended, "red" may indicated a product or service that is not recommended, and "gray" may indicated no recommendation. A call center representative can use this color-coding functionality to quickly identify optimal products and services to recommend to the given customer. As will be understood, other ranking schemes and mechanisms may be used as will occur to one of ordinary skill in the art.

Along with the ranked recommendations, the recommendation engine 1010 can generate a report that provides users with details of the ranked products, their advantages, and reasons illustrating the suitability of the product or service to the user. Users 106 may browse through the results, their details, and recommendations to decide which product or service they would like to acquire. In another embodiment, the most optimal product or service may be automatically ordered for a particular consumer, or an ordering screen may be pre-populated with the most optimal product or service.

Users 106 can notify the computing system 102 of their selection and the computing system 102 may navigate the user 106 through a service/product acquisition procedure (e.g., as described previously in conjunction with FIGS. 2 and 7-9). If the user decides to purchase a product on the list, the order information is provided back to the consumer engine 130 and stored in the order history database 124 for future use. For example, if the user selected the third option on the list as compared to the first option, the consumer engine 130 may assess the reasons for the user's choice (e.g., via a consumer survey, or by identifying patterns in selected options), and use this information to provide better results in the future. In this manner, the consumer engine 130 continuously learns from the user inputs and choices to provide better recommendations to the user. For example, it may be determined based on analysis of order history data that users are more interested in the price of an Internet service plan as compared to the data rate it provides. Then, this information can be stored, and the next time the user accesses the system, the consumer engine 130 may dynamically increase the weights associated with the price parameter and decrease the weights associated with the data rate parameter, to provide service plans that better suit the user 106 (further details relating to weighting of parameters to identify optimal products and services are discussed below). Further, users 106 can provide feedback based on the results, which can again be used by the consumer engine 130 to optimize its results and recommendation process.

Exemplary Products and Services Database

Figure 11:
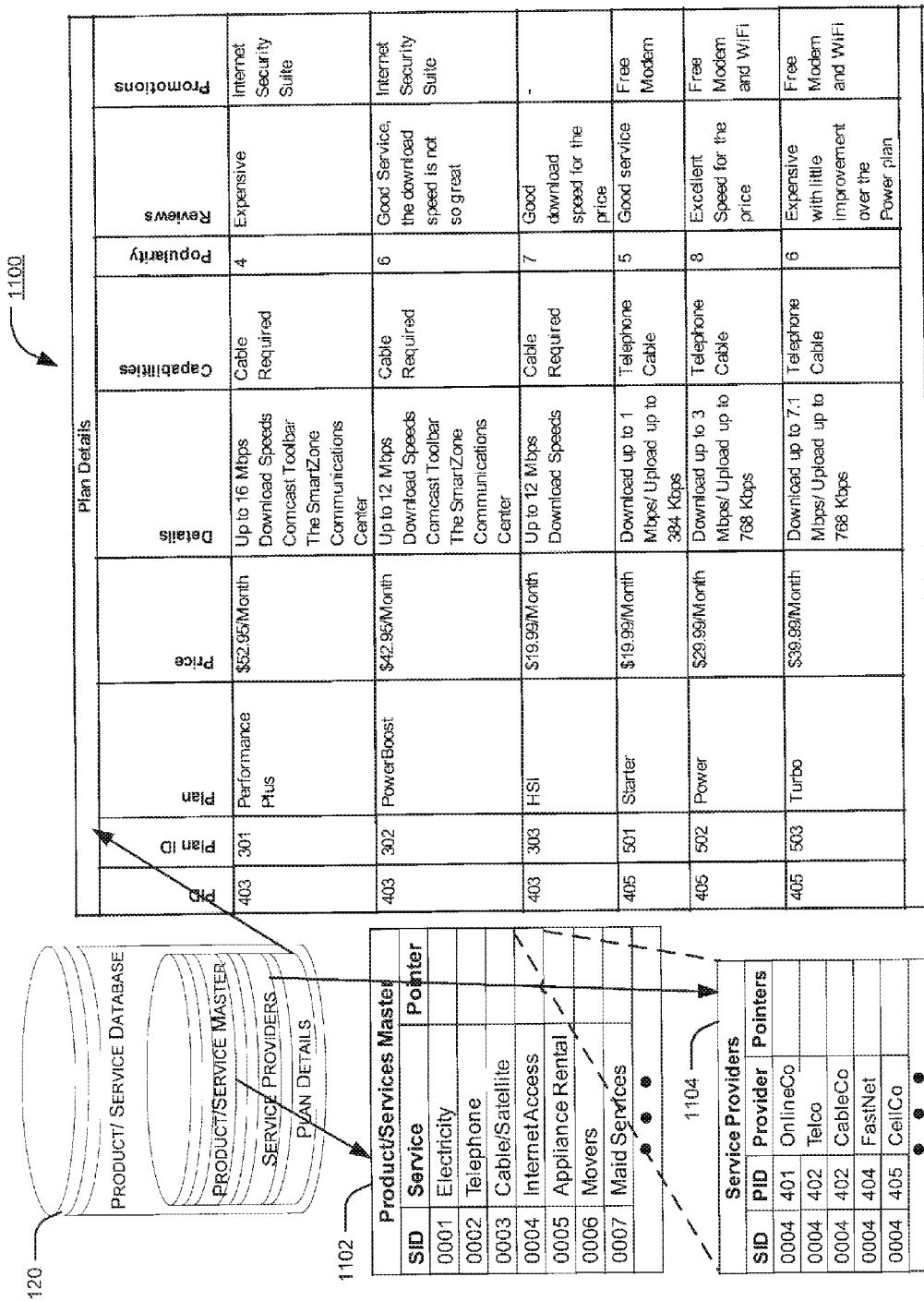
FIG. 11 illustrates an exemplary products and services database schema.

FIG. 11 illustrates an exemplary products and services database schema 1100. As described, this product and services database provides input information into the product engine 1002. According to one embodiment, the products and services database 120 may store data in a relational fashion. A typical relational database includes a plurality of tables, each table containing a column or columns that other tables can link to in order to gather information from that table. By storing this information in another table, the database can create a single small table with the locations that can then be used for a variety of purposes by other tables in the database. FIG. 11 illustrates some exemplary tables that may be present in the products and services database 120. It will be understood, however, that the number of tables, specific tables shown, data in the tables, and the relation between the tables may vary depending on the particular embodiment, without departing from the scope of the present disclosure.

As shown in FIG. 11, the schema 1100 includes a product or service master table 1102, which includes a list of all the products or services offered by the computer system 102. Each product or service is associated with a unique-service identification number (SID). The master table 1102 can be related to one or more other tables through the unique SID. For example, the master table 1102 may be related to a service provider table 1104 that stores data of all the available service providers 104 for a particular service. In this example, the service provider table 1104 depicts all the Internet service providers available in the electronic system 100. Each service provider 104 is associated with a unique provider identification number (PID). The service provider table 1104 in turn may be related to other tables that include details about the service providers 104, such as addresses, contact details, geographical areas serviced, and the like. For instance, the service provider table 1104 may be related to a plan details table 1106. This table stores additional information related to the service providers 104 and individual plans offered by the service providers 104. Some exemplary data fields may be plan name, price, plan details, capabilities required, plan popularity, plan reviews, and promotions offered. Other data fields (not shown) may include data rates offered, installation charges, mid other pertinent data fields. As will be understood and appreciated, virtually any type of data or information relating to products and services offered by the facilitation system 102 may be stored in the product and service database 120.

Exemplary Order History Database

Figure 12:
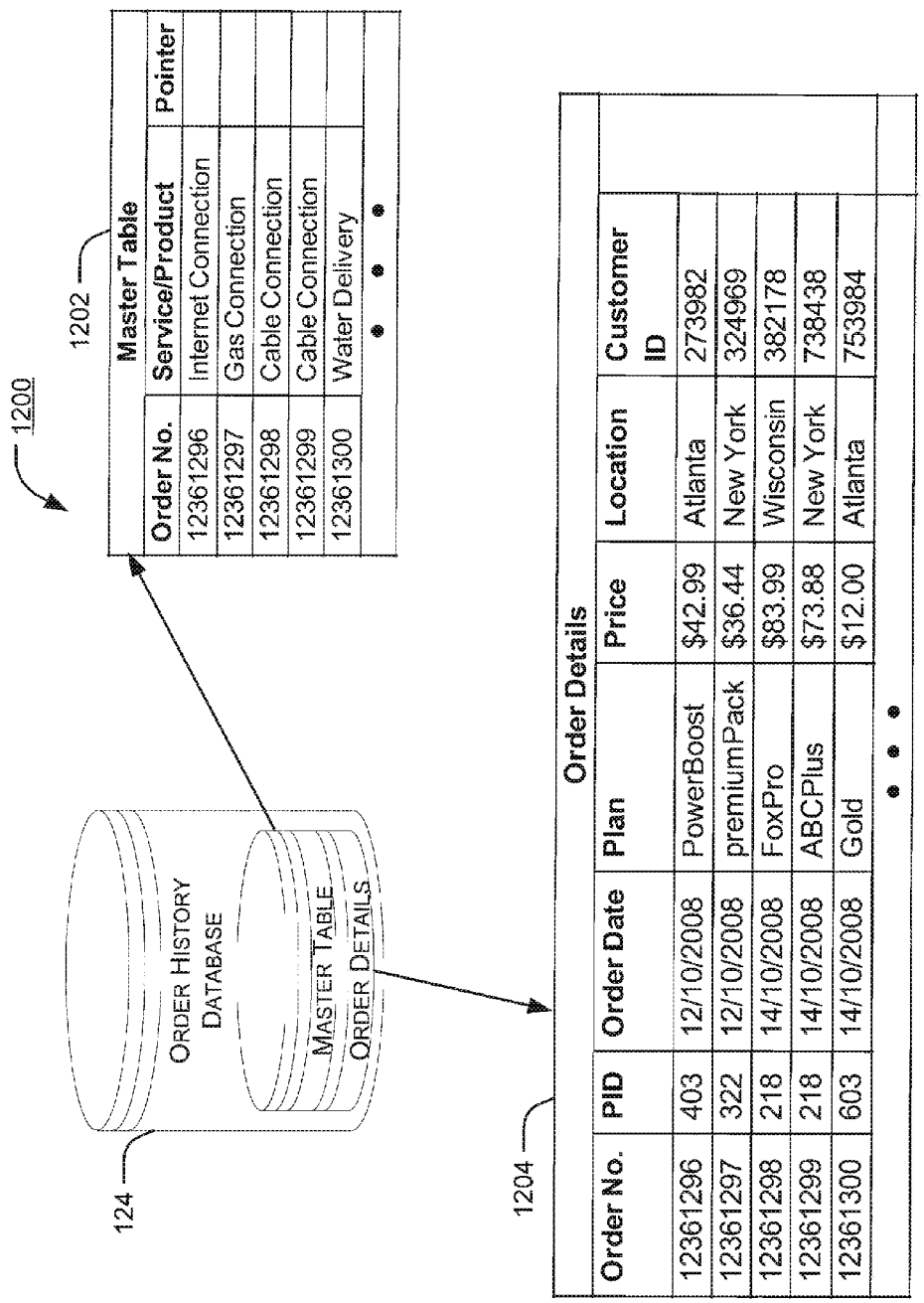
FIG. 12 illustrates an exemplary order history database schema.

FIG. 12 illustrates an exemplary order history database schema 1200. As with the exemplary products and services database 120, the order history database generally provides information to the product engine 1002. According to one embodiment, the order history database 124 includes one or more cross-referenced tables that include various order details. A master table 1202 includes unique order numbers and the services to which they correspond. By analyzing the data in this table, the most popular product and service categories (i.e., most commonly-ordered) can be identified. The master table 1202 is linked to one or more order detail tables (e.g., table 1204). The data fields in table 1204 include order number, associated service provider, service plan, price, date of the order, and customer identification. In one embodiment, as this table includes the customer and provider identification numbers, this table can be linked with provider and customer tables to retrieve provider details and customer details associated with a purchase order. From the order history data, service providers 104 and administrators can determine the most popular product, the geographical location in which that product is most popular, product purchase patterns, locations where a service provider 104 is unpopular, and many other such determinations.

It will be understood that the order history database 124 may include more or fewer order-related data fields and tables without departing from the scope of the present disclosure.

Exemplary Product Engine

Figure 13:
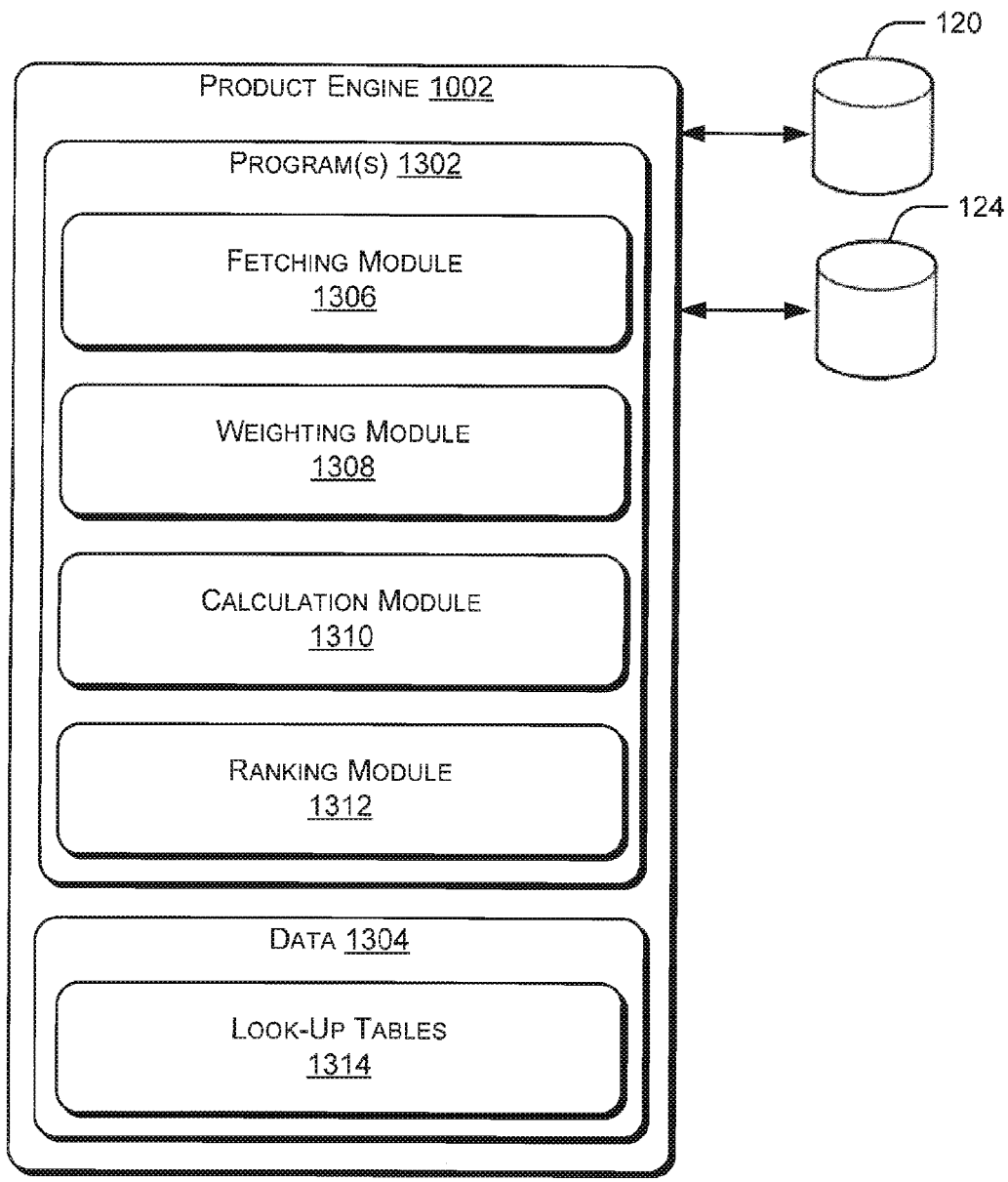
FIG. 13 illustrates an exemplary product engine according to one embodiment of the present disclosure.

FIG. 13 illustrates an exemplary product engine 1002, and its associated modules. As described previously, the engine interacts with the products and services database 120 and the order history database 124. For example, information such as product-specific information (e.g., price, plan name, features, product type, product terms, etc.), financial characteristics, offers, sales, promotions, product ratings, and user reviews can be fetched from the products and services database 120, while information such as popularity growth of a product, and patterns depicting product orders can be retrieved from the order history database 124. For example, the order history database 124 may include information indicating that 135 instances of a particular plan were sold last month, which is greater than any other sales of this type of plan, suggesting that consumers like, this plan or order it frequently, and thus it should be ranked higher. The product engine 1002 includes one or more programs 1302 and data 1304. According to the embodiment shown, the programs 3302 further include a fetching module 1306, a weighting module 1308, a calculation module 1310, and a ranking module 1312. The data may include one or more look-up tables 1314 incorporating fetched data and other data.

In one embodiment, the fetching module 1306 retrieves products and services from the databases 120 and 124, including any information associated with each product and service. In one embodiment, the fetching module 1306 may retrieve all the products and services from the products and services database 120. Alternatively, the fetching module 1306 may retrieve only products and services corresponding to a particular user preference or geographical area. For example, if the user indicates a preference for only Internet services and cable services, the fetching module 1306 may retrieve data corresponding only to these two services. Alternatively, if the user 106 provides address information, the fetching module 1306 may retrieve products and services pertaining to the user's address. It will be understood that the data fetched by the fetching module 1306 can be governed by other factors as well, such as preferred service providers, active service providers, and soon, without departing from the scope of the present disclosure.

The weighting module 1308 assigns weights to parameters associated with the third party products and services. Weighting is used in order to appropriately rank products and services based on desired criteria. For example, it may be determined that price is the most important parameter associated with all products and services. Thus, the price parameter will be given the greatest weight for a subsequent ranking calculation. As referred to herein, a "parameter" relates to an item of information associated with each product or service. For example, a parameter may be the price of the product or service, or a popularity rating assigned to each product or service, or the duration of a given service (e.g., 6-month contract required), etc. Further exemplary parameters include gross revenue of each product or service, conversion rate, completion rate (i.e., percentage of services actually installed as compared to ordered), payment rate (i.e. percentage of services actually paid for as compared to ordered), popularity index, special promotions, plan price, and growth rate. Based on certain criteria, weights are assigned to these parameters, for example, higher weights may be assigned to plan price or plan popularity index as compared to gross revenue or conversion rates.

Before assigning weights, the weighting module 1308 may standardize the values for each parameter, if the values are not in a standard format. For example, it may be difficult to compare product price to a popularity index, as these are two different measures (i.e., dollars as compared to a popularity value). Thus, each of these parameters may be normalized based on a standard value (e.g., 3, 2, or 1 for high, medium, or low; or a percentage value for each particular parameter in a particular product or service as compared to an average that parameter type across all products and services). The parameters and weights may be pre-determined and stored in the look-up table 1314, or the system or an administrator can dynamically select parameters and weights for the products and services, etc.

The calculation module 1310 performs calculations on the weighted parameters to obtain a score for each fetched product or service. In one embodiment, the weight assigned to each parameter is multiplied by the parameter value to obtain a composite score for the particular product or service. The calculated score for each parameter is totaled to obtain a final score for each product or service. This final score is used to rank each product or service in order of recommendation. Thus, if a given product or service included a low price, but high popularity value, then that product or service may achieve a high composite score, and may be given a corresponding high rank.

The ranking module 1312 generates an ordered list of products or services based on the final score for each product or service, and stores it within the products and services database 120. In one embodiment, the products or services are segregated based on the service. For each service type, an ordered list is maintained in the products and services database 120. For example, the scores of all the water delivery services are tallied to generate a ranked list of water delivery services. Further, as mentioned previously, the ranking module 1312 may provide color-coded schema to differentiate between the services. The ranking module 1312, for instance, can assign green for excellent products or services, yellow for average rated products, and red for low rated products. As discussed previously, these ranked results can be provided to a consumer for review and selection, or to a customer service representative to suggest certain products or services to the consumer, or otherwise used as will occur to one of ordinary skill in the art.

Once the products and services are ranked according to predefined criteria, the ranked results may be provided to the filter 1008 and/or recommendation engine 1010 for further processing and or presentment to users. Additionally, the ranked results may be utilized independently by service providers 104 to optimize their products or services, and in turn enhance consumer experience.

Exemplary User Information Database

Figure 14:
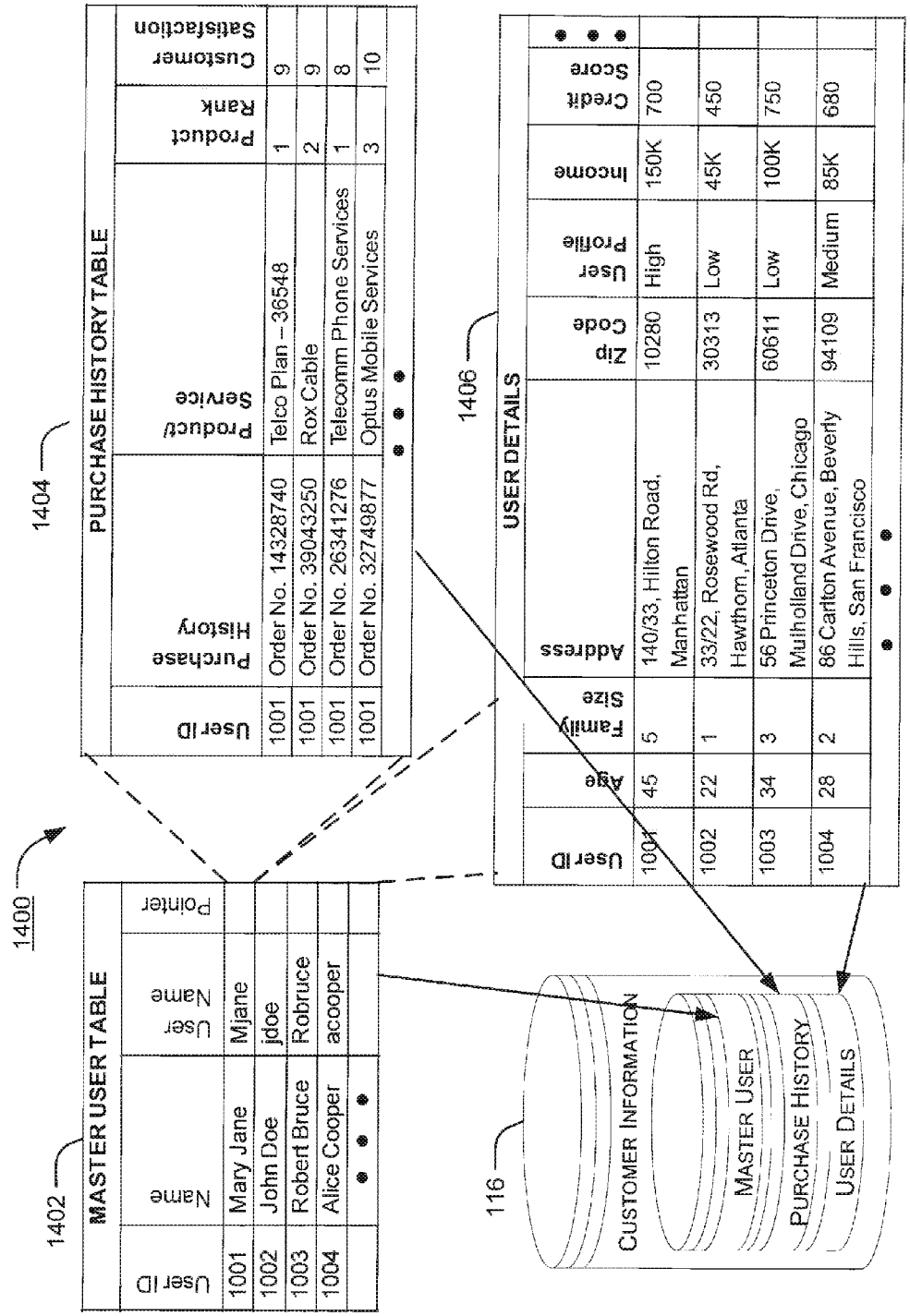
FIG. 14 illustrates an exemplary user information database schema.

FIG. 14 illustrates an exemplary user information database schema 1400. As described previously, the information in the user information database is generally used as an input into the user profile engine 1006. As described in reference to FIGS. 11 and 12, the customer information database 116 may also comprise a relational database including a number of inter-related tables. In the embodiment shown, the schema 1400 includes a master user table 1402 with names of all the system's customers along with their usernames and unique user IDs. This table 1402 may be related or connected to one or more other tables, such as a user details table 1404, which includes user profile details including user age, family size, address, zip code, user profile rating, income, credit score, and other relevant details. Other data fields or tables may include information such as user contact details, payment details, credit card information, user password, and so on. One such table, a purchase history table 1406, includes information pertinent to the user's purchase history. The data fields in the purchase history table 1406 may include user ID, order numbers, product or service purchased, product rank at the time of purchase, and customer satisfaction with product or service. It will be understood that the tables in the user database may have more or fewer data fields, or completely different data fields, as compared to the exemplary tables depicted in FIG. 14. Further, the type, number, and size of the tables may also vary without departing from the scope of the present disclosure.

Exemplary User Profile Engine

Figure 15:
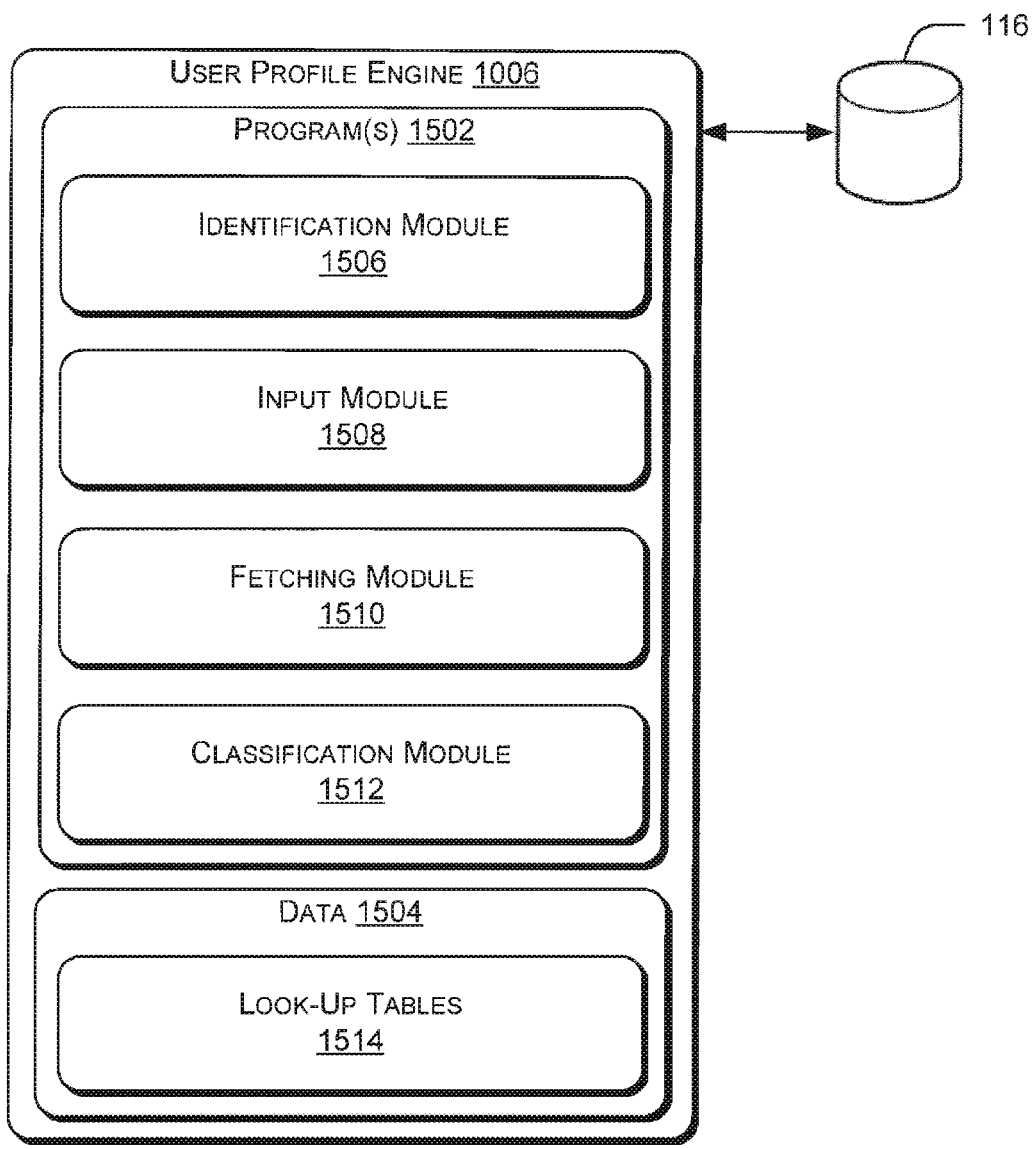
FIG. 15 illustrates an exemplary user profile engine according to one embodiment of the present disclosure.

FIG. 15 is a block diagram of m exemplary user profile engine 1006. As mentioned previously, the engine interacts with the customer information database 116 to classify users in one or more categories, or rank users based on information associated with each user. To this end, and according to one embodiment, the user profile engine 1006 includes one or more programs 1502 and data 1504. The programs include an identification module 1506, an input module 1508, a fetching module 1510, and a classification module 1512. The data 1504 may include one or more look-up tables 1514. As will be understood and appreciated, the user profile engine 1006 shown in FIG. 15 is but one embodiment of this engine as contemplated by the present disclosure.

The identification module 1506 prompts the user 106 to input user identification information through the user interface 126. The user identification information may include user name, user ID, verification password or information, user email address, telephone number, and other such information. On receiving the user identification information, the identification module 1506 may query the master user table 1402 in the user information database to verify the user 106.

The identified user is prompted by the input module 1508 to provide additional information such as user preferences and address details. In one embodiment, the input module 1508 may retrieve the last saved user address and request the user 106 to confirm the address details. The user 106 may intimate the system of his or her preferences either by inputting requested particular products or services, or by selecting one or more products or services from an extensive displayed list of products or services. In an alternative embodiment, the input module 1508 may prompt the user to drill down further in the list of selected services to provide service provider preference. Here, the user may select one or more service providers for the selected services. In some instances the input module 1508 may request users to provide additional information, such as financial details, credit scores, age, family size, and so on.

The fetching module 1510 retrieves all information pertaining to the identified user. The customer information database 116 may include information such as personal details, age, marital status, family size, annual income, credit scores, and other user related information. In a few cases, some of this information may not be available in the customer information database 116; in these cases, the fetching module 1510 may prompt the input module 1508 to request the user 106 to provide these details, or may obtain information from external sources 110.

The classification module 1512 receives user details from the fetching module 1510 and standardizes the information if needed (similarly to the standardization of parameters in the product engine 1002). Based on one or more user detail parameters (i.e., the specific items of information stored or retrieved for each user), the classification module 1512 categorizes the users. Administrators may specify one or more classification schemes, based on the parameters, such as high, medium, low profile: premier customer, gold customer, silver customer; high priority customer, regular customer; service based categorization, or address based categorization. Alternatively, customers may be ranked (e.g., on a scale of 1-10) according to a composite score of weighted parameters associated with each user, wherein the ranking corresponds to a certain criteria (e.g., high value customer, new customer, etc.).

For each classification scheme, a different set of parameters may be used. For example, to classify users as premier, gold, or silver customers, the classification module 1512 may use a user's purchase history information, income details, and credit scores. Alternatively, to classify users 106 based on required services, the user preference information alone may be used. It will be understood that a number of classification systems may be contemplated, using one or more user detail parameters. Further, the classification module 1512 may apply different weights to the parameters; for example, while classifying users as premier, gold, and silver, the classification module 1512 may assign higher weights to the user's purchase history as compared to the user's income or age. Generally, the weights, parameters, and classification schemes used are predetermined by a system administrator. In one embodiment, however, these factors are identified dynamically based on pattern recognition within users.

The values corresponding to the parameters may be calculated to obtain a final score for the user 106. Each category in a classification system can include a range of scores, and this information is stored in the look-up table 1514. By tallying the user's score with the category ranges in the look-up table 1514, the classification module 1512 assigns a category to the user 106. User classification in this manner may be used internally within the computer system 102 to manage call center queues, optimize user experience, and optimize call handing times. For example, high value customers can be addressed first.

Also, the user classifications can be used to filter certain products or services via the filtering module 1008. For example, once a product and service ranking for a particular customer is retrieved, some of the products or services may be removed from the list (or moved in terms of priority in the list) based on a customer's classification (e.g., expensive products may be removed for customers in a "low value" class corresponding to low incomes). Further, the user profile information may be provided to the recommendation engine 1010 to provide the most relevant results to the user 106.

Exemplary Address Database

Figure 16:
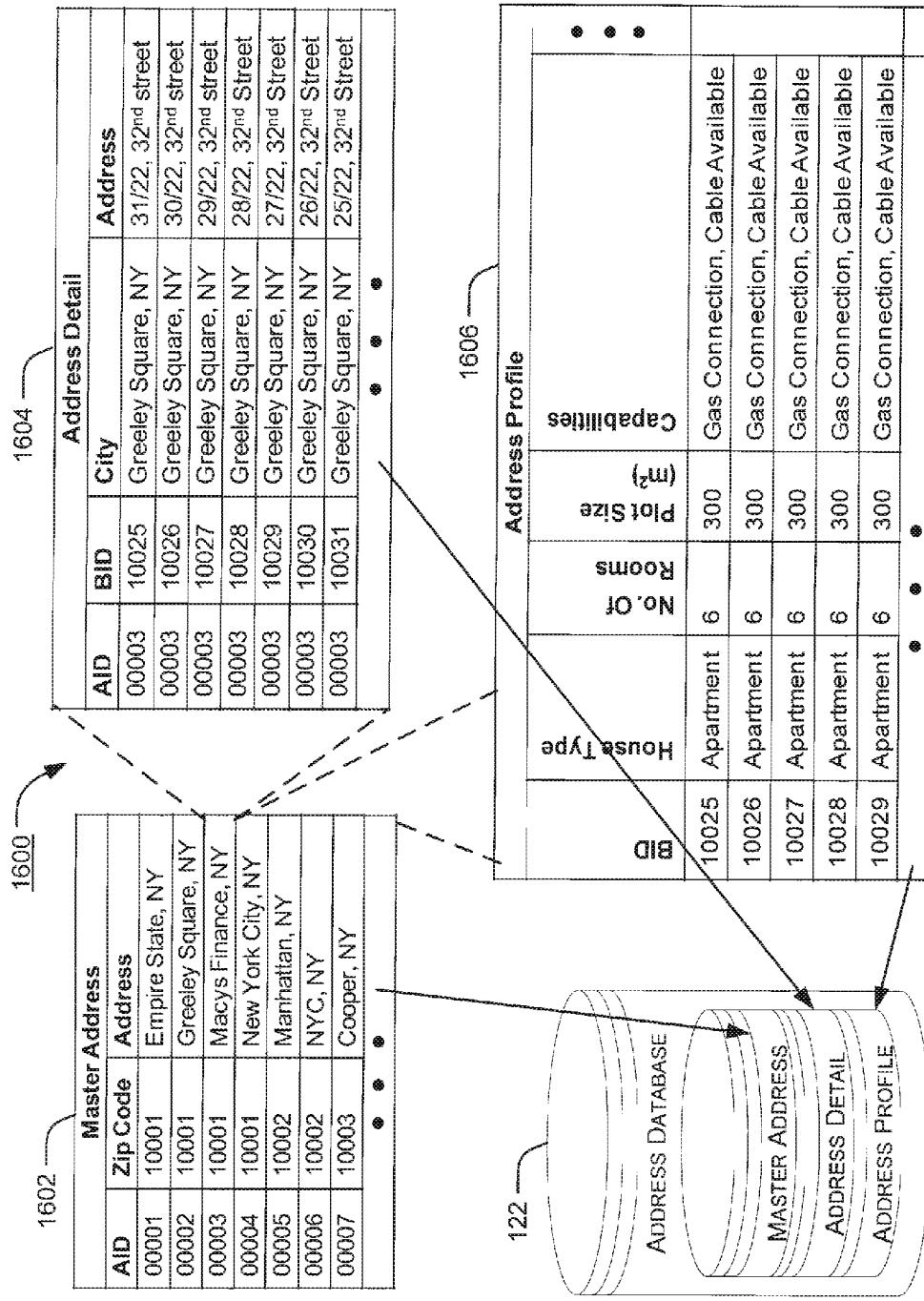
FIG. 16 is a schematic illustrating an exemplary address database.

FIG. 16 is a database schema 1600 illustrating exemplary data tables in the address database 122. Similar to FIGS. 11, 12 and 14, the tables in this exemplary database have pointers and relations, cross-referencing data from one table to another. According to the embodiment shown in FIG. 16, the schema 1600 includes a master address table 1602 including address information for particular geographic regions or areas. For example, the master address table 1602 may store city, state, county, etc., data for every zip code in the US. Each address or entry in the master table 1602 is associated with a unique address identifier (AID). The database may include separate tables for each AID, with actual residence or location addresses within each particular AID. For example, within AID 00003, there may be sub-identifiers for each apartment number, or specific address, or building, etc. This information is depicted in an exemplary address detail table 1604. Further, each entry in the address detail table 1604 may have a detailed address profile table, such as an address profile table 1606. This table 1606 may include specific details about each residence, such as residence type, number of rooms, plot size, capabilities available at the residence, and other similar details. If will be understood that various other parameters may be included in the address profile table 1606, describing various other property details, such as previous services installed or provided at the address, services providers used previously or currently, and so on. It will also be understood that these tables are merely exemplary and may not represent the actual number or type of tables, or data values that may be present in the address database 122.

Exemplary Location Engine

Figure 17:
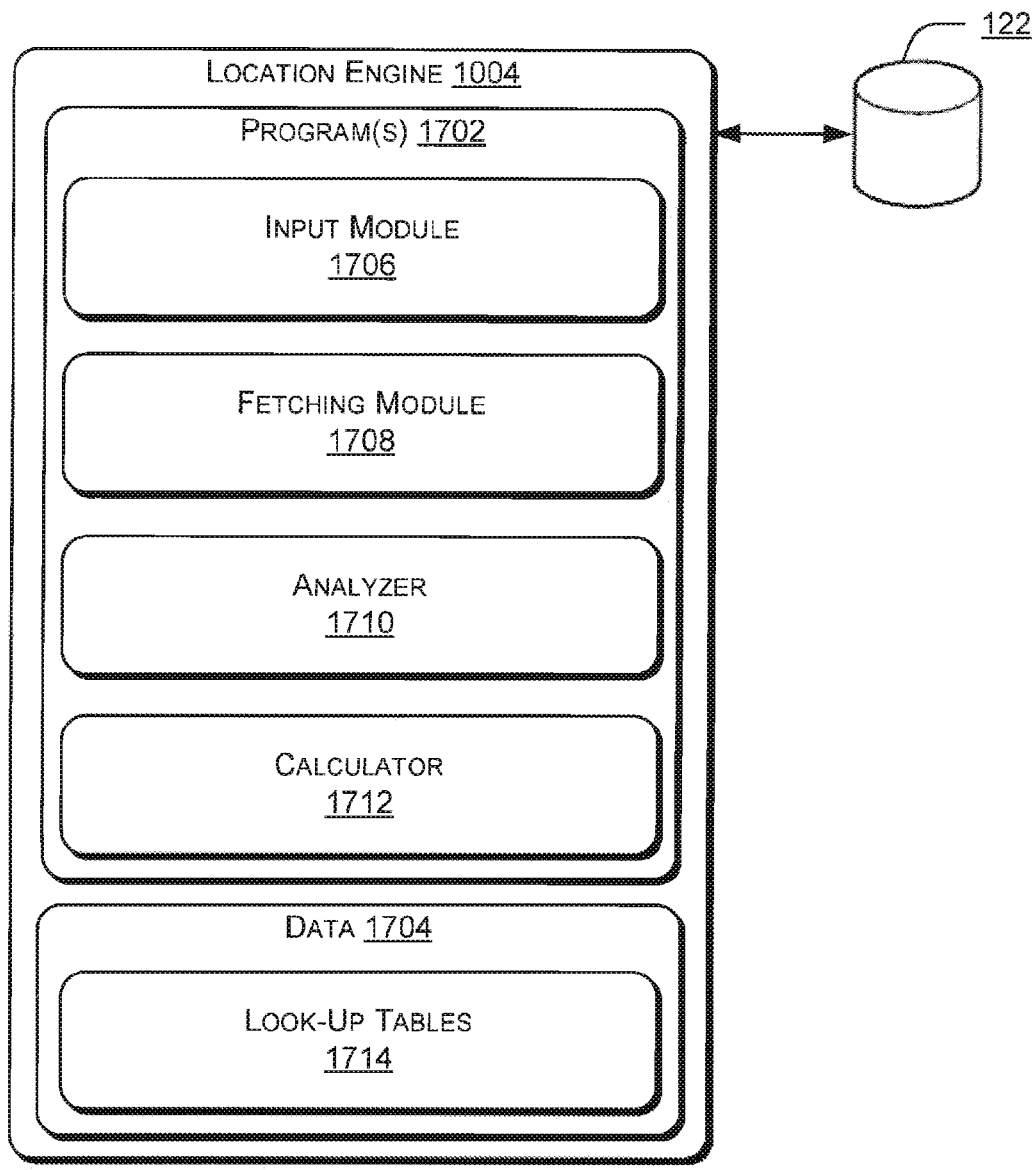
FIG. 17 illustrates an exemplary personalization engine according to one embodiment of the present disclosure.

FIG. 17 illustrates an exemplary location engine 1004 according to one embodiment of the present disclosure. As mentioned previously, the location engine 1004 interacts with the address database 122 to provide a list of services and products available and suitable for a given properly. To this end, the location engine 1004 includes one or more programs 1702 and data 1704. In the embodiment shown, the programs include an input module 1706, a fetching module 1708, an analyzer 1710, and a calculator 1712. The data 1704 may include one or more look-up tables 1714.

In one embodiment, the user profile engine 1006 and the location engine 1004 may share a common input module to receive user inputs. Alternatively, each engine may have its own input module. The input module 1706 retrieves address information from the user. In an instance in which the user has already provided the address information, the input module 1706 may verify this information with the user.

The fetching module 1708 retrieves information pertinent to the address provided by the user. For example, the fetching module 1708 may retrieve data similar to that shown in address profile table 1606. In a situation in which the user does not provide complete address information, the database may retrieve higher-level address details such as city or street details, and address details corresponding to the city or street address. If the database has insufficient information, the fetching module 1708 may prompt the input module 1706 to retrieve more information from the user, such as residence type (e.g., apartment, condominium, stand-alone home, etc) and ownership information (e.g., rented or owned). Further, the fetching module 1708 may retrieve data, such as geographical areas serviced by the provider, from the products and services database 120.

The analyzer 1710 receives the fetched information and determines a list of services available at the user address. By comparing the user zip code or street address with information regarding geographical areas serviced by the provider, the analyzer 1710 can populate a list of services and service providers available at the user address. In one embodiment, the analyzer 1710 stores this list in the address database 122 corresponding to the user address. Accordingly, the next time the user requests a service, these steps may be skipped and the list of available services can be simply retrieved from the address database 122 along with the other address information.

This populated list is provided to the calculator 1712 along with other house details. Similarly to the product engine 1002 and user profile engine 1006, the calculator 1712 in the location engine 1004 uses details and information associated with a user's address to determine which products best meet the needs of the user living in the given property. Using one or more parameters with associated weights, the calculator 1712 derives a score that can be used to classify the given property or associate particular products and services with the property. For example, if the house is an individual property in the suburbs, the calculator 1712 may recommend a security system for the household to protect the household and family members from unwanted intruders. For an older property, the calculator 1712 may recommend home warranty products based on an assumption that properties over a certain age are more likely to have issues or problems. As will be understood, predetermined rules and criteria are used to dictate which products and services should be associated with properties in a given class. Offering these tailored services to consumers helps build trust, increase sales probability, and reduce the handle time and other costs that in turn result in optimal user experience. Information about previous products or services connected in the home is also used to offer the most appropriate solutions to users. For example, if a home was previously wired for home security, the calculator 1712 can recommend a home security product to the new tenants due to reduced installation costs and logistical overhead.

According to one embodiment, the personalized information derived from the personalization engine 1004 is provided to the filter 1008 and the recommendation engine 1010 to obtain a final list of product recommendations for the user.

Exemplary Method(s)

The following sections describe exemplary methods for carrying out one or more embodiments of the present disclosure. The methodology described herein is generally intended to describe various features and functionality of various system components described previously. The order in which the methods are described is not intended to be construed as a limitation, and any number of the described method blocks can be combined in any order to implement the method, or an alternate method. Additionally, individual blocks may be deleted from the methods without departing from the spirit and scope of the subject matter described herein. Furthermore, the method can be implemented in any suitable hardware, software, firmware, or combination thereof.

Figure 18:
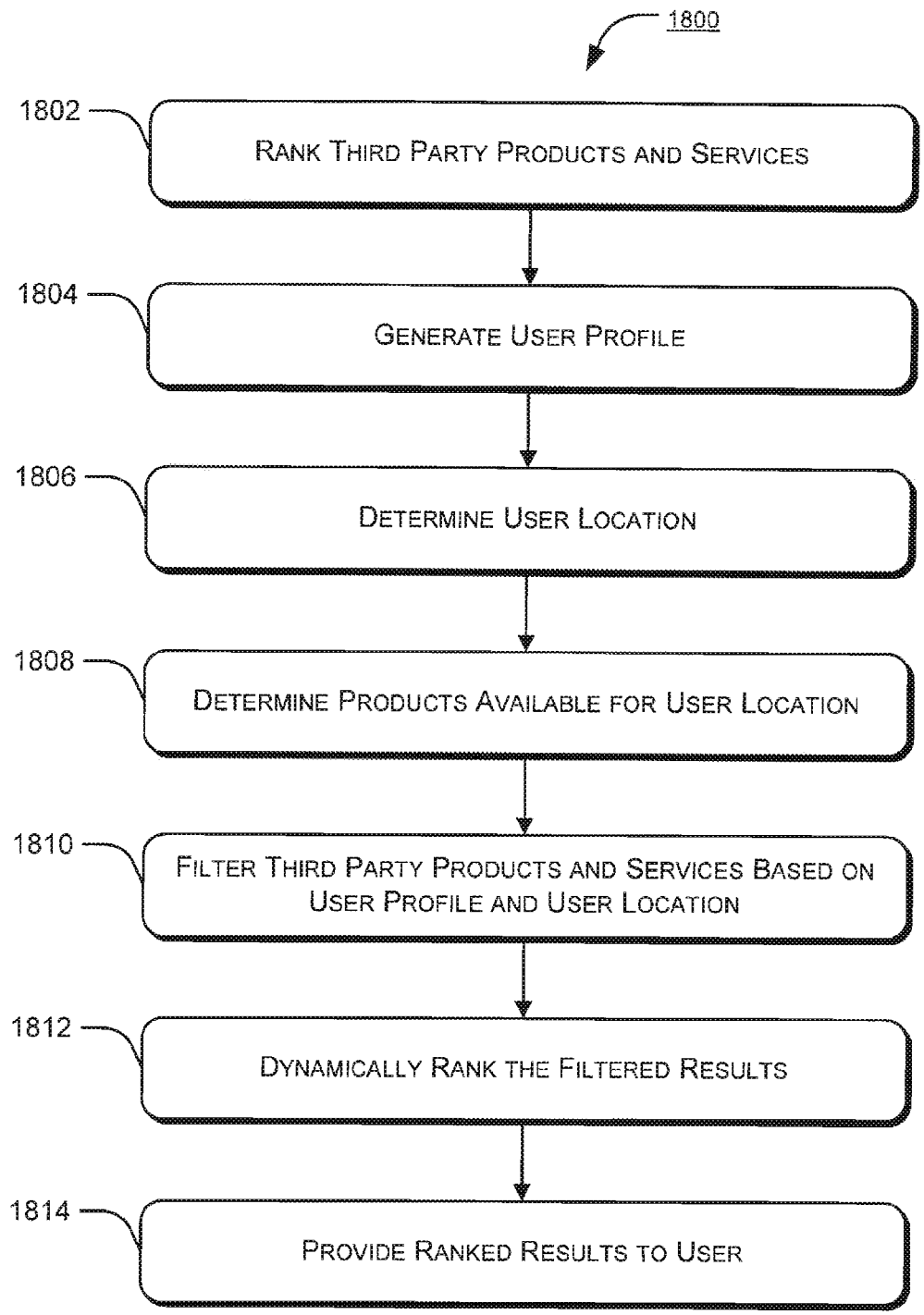
FIG. 18 is a flowchart illustrating an exemplary method for recommending third party products and services to an end user.

FIG. 18 is a flowchart illustrating an exemplary method 1800 for recommending third party products and services to a user. At step 1802, the third party products and services are ranked, as described previously in conjunction with FIGS. 11-13, and others. In one embodiment, the product engine 1002 ranks not only the products and services, but also the product and service providers 104 and their plans using one or more factors associated with the third party products and services.

At step 1804, a user profile is generated for a given user. The user profile engine 1006 classifies the user under one or more categories depending on one or more user-related parameters (as described previously in conjunction with FIGS. 14, 15, and others). For example, the user may be classified as a premier customer if the user is a highly active customer (e.g., a customer that frequently uses the electronic facilitation system 102) with a good credit score. Alternatively, a user may be classified as a low profile customer if the user has rarely purchased any item from the electronic system 102, or has a poor credit score. In some embodiments, the user profile may be stored in the user information database 116, and subsequently retrieved as needed, such that a user profile calculation does not have to be performed as a later date. In some other embodiments, the user may be upgraded based on recent activity. The user profile may be updated each time the customer visits the system, or at predefined periods.

At step 1806, a user location is determined. As described previously, the user location may be retrieved based on stored information, or may be input by the user during the product or service ordering session.

At step 1808, a determination is made regarding the most appropriate products and services for the user based on the geographical location of the user. The location engine 1004 determines the services or products available at the user's address, and analyzes the address parameters to determine the best products or services for the household.

At step 1810, the ranked third party products and services are filtered based on user profile and the geographical location of the user. For example, if the user profile is "tow" (e.g., the user has low income and a low credit score) and the user resides in Oklahoma City, the filter 1008 can remove third party products and services from the ranked list that require high credit scores and that do not operate in Oklahoma.

At step 1812, the filtered results are dynamically ranked. Here, based on the ranked services and products, user preferences, user profile, user address, and address associated service recommendations, the recommendation engine 1010 determines the most suitable products and services for the user. In one embodiment, the recommendation engine 1010 can assign different weights to the parameters and outputs of the other engines 1002, 1004, 1006, and provide an ordered list of results for the user based on various predetermined criteria. For example, in one embodiment that is focused on user satisfaction, the user preference parameter may be assigned the highest comparative weight. The ordered output list is provided to the user for further action. Based on the ranked list (e.g., FIG. 6), the user may select services or products to acquire or purchase. Additionally, as described, the ranked list may be used by a customer service representative interacting with the user to suggest optimal products or services to the user. Or, the most optimal or highest ranked product or service can be automatically ordered or selected by the user. As will be understood, the ranked list of products or services can be used in a variety of ways as will occur to one of ordinary skill in the art.

Figure 19:
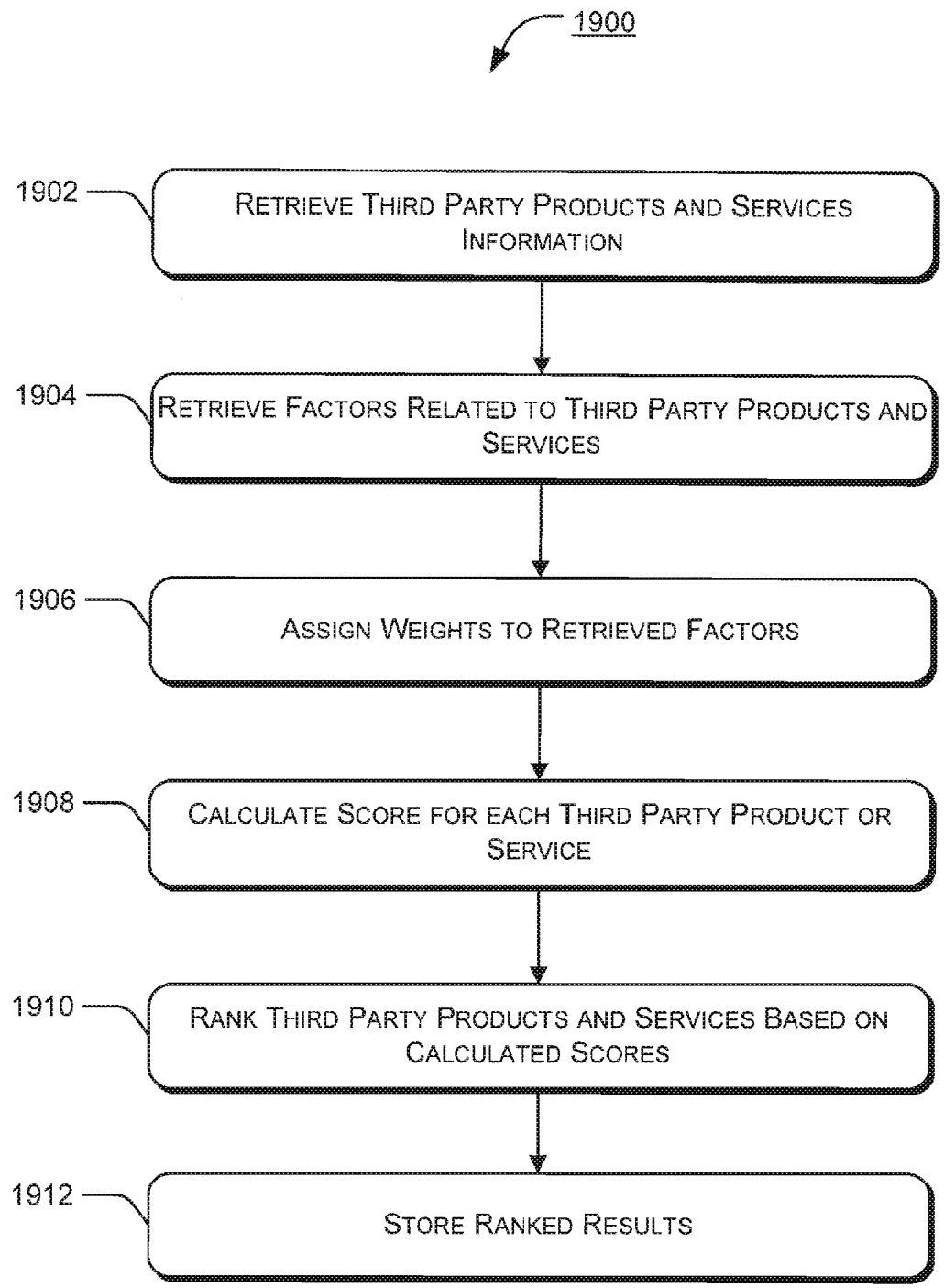
FIG. 19 is a flowchart illustrating an exemplary method for ranking third party products and services.

FIG. 19 is a flowchart illustrating an exemplary process 1900 for ranking third party products and services, prior to further analyzing those services and recommending optimal products and services to a user. According to one embodiment, the ranking process 1900 is performed by the product engine 1002. At step 1902, third party product and service information is retrieved. In one embodiment, the product engine 1002 retrieves this product and service information from the products and services database 120, and the order history database 124. At the next step, step 1904, the product engine 1002 retrieves factors (i.e., parameters) associated with the third party products and services. The factors may include consumer experience information, on-going promotions or sales information, plan type, plan price, product reviews, product popularity, number of sales, and other such factors.

At step 1906, weights are assigned to the retrieved factors. In one embodiment, the weighting module 1308 assigns pre-specified weights from a look-up table. Alternatively, an administrator can modify the weights on the fly.

Next, for each third party product or service, a composite score is calculated at step 1908. The weights identified at step 1906 are multiplied by the value of each factor to obtain a mathematical value. The value for each factor is totaled to obtain a total score for the product or service. As mentioned previously, in some embodiments, the factors are normalized or standardized (e.g., assigned a value based on relative size, percentage, etc.) prior to being multiplied by the predetermined weightings so that the data can be analyzed in a standardized fashion.

Based on the total scores, the ranking module 1312 orders the third party products and services, at step 1910. Generally, each product or service category includes an associated ranked list of service providers. Finally, the ranked results may be stored in the products and services database 120 for subsequent use.

Figure 20:
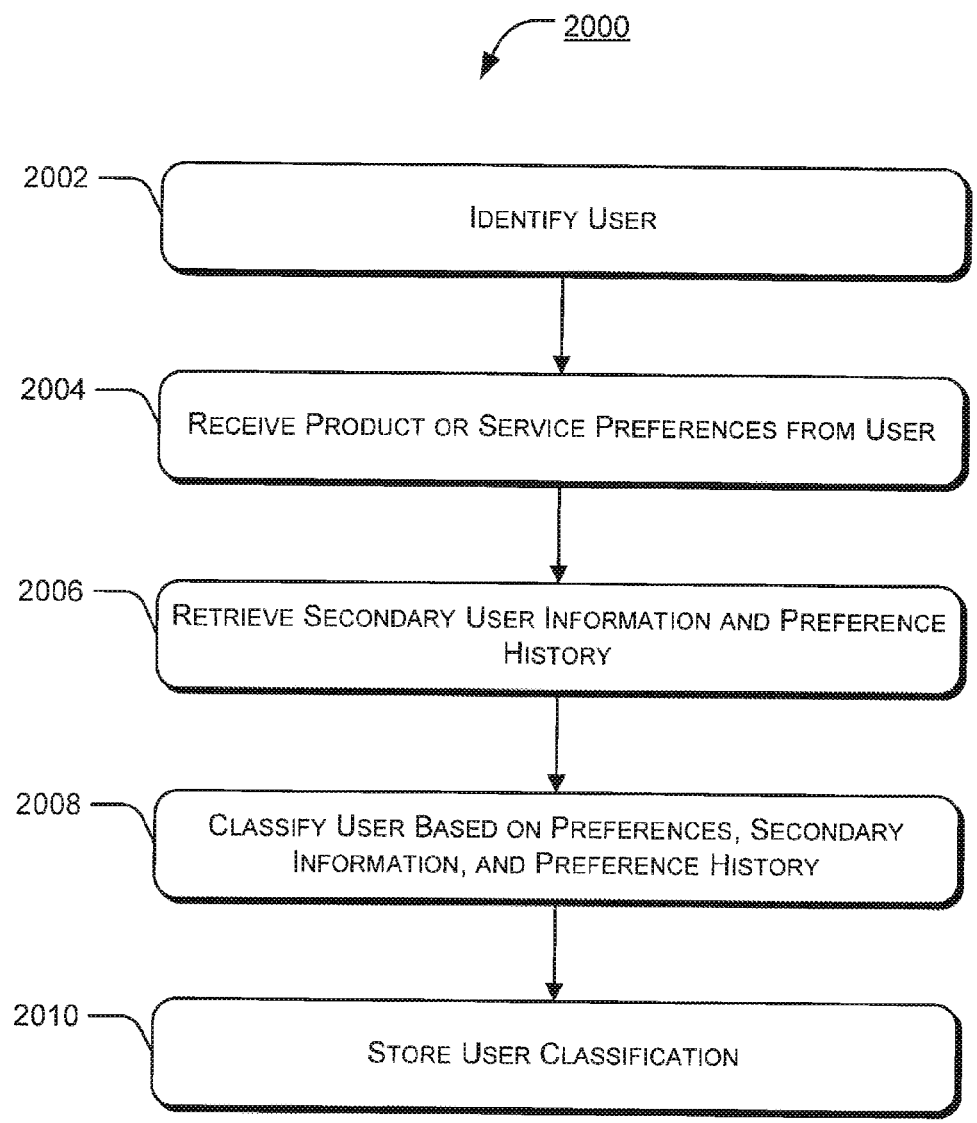
FIG. 20 is a flowchart illustrating an exemplary method for profiling end-users.

FIG. 20 is a flowchart illustrating an exemplary method process 2000 for generating a user profile (i.e., classifying a user). According to one embodiment, the process 2000 is carried out by the user profile engine 1006. At step 2002, a user is identified that is accessing the facilitation system 102 via the user interface 126 (or via a customer service representative accessing the user interface). To this end, the identification module 1506 requests the user to provide identification information such as user name, email address, telephone numbers, social security number, date of birth, verification password, account number, account name, or identification information. This information is compared with a list of customers in the customer information database 116 to authenticate the user.

At step 2004, the fetching module 1530 retrieves systematically stored user information and preference history from the customer information database 116

At step 2006, user preferences are retrieved. In one embodiment, the input module 1508 prompts the user to provide preference information. Any technique known in the art can be used to receive this information from the user. In some embodiments, if some information is missing in the user details retrieved from the database, the input module 1508 can query the user for this information.

User preference and details are provided to the classification module 1512 at step 2008 to classify the user. As described with reference to FIG. 15, one or more classification systems may be utilized and one or more user detail parameters may be utilized by the classification systems in order to categorize the user. Alternatively, user profile information may also be available in the customer information database 116, and that profile information can be used instead of performing this operation again.

At step 2010, the user classification data is stored in the customer information database 116 for subsequent use.

Figure 21:
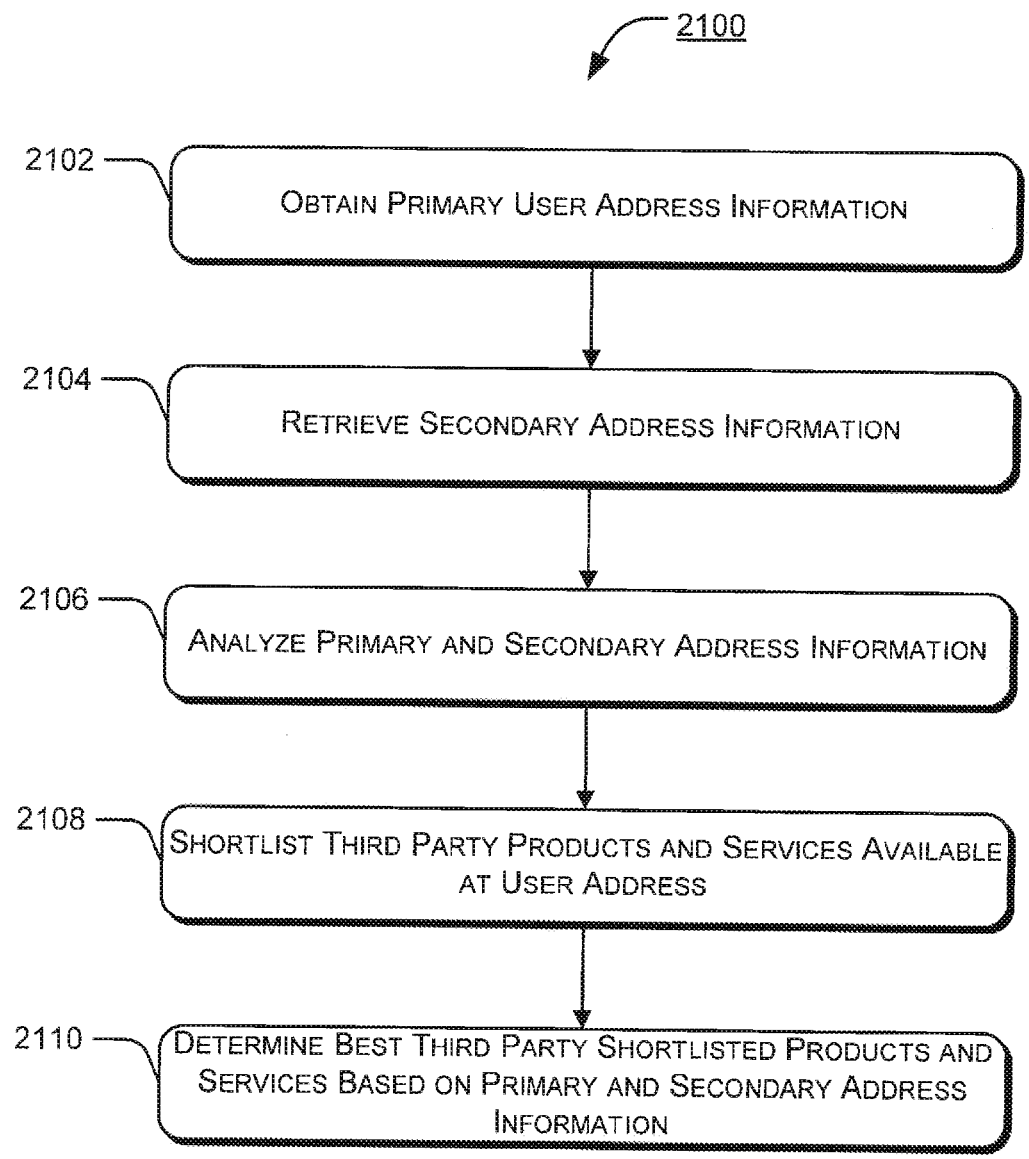
FIG. 21 is a flowchart illustrating an exemplary method for personalizing third party products and services based on user address.

FIG. 21 is a flowchart illustrating an exemplary process 2100 for determining the most appropriate products or services based on a user address. According to one embodiment, the process 2100 is carried out by the location engine 1004. At step 2102, primary user address information is obtained. In one embodiment, the user is prompted to provide address information. In another embodiment, however, the customer information database 116 may already contains the user's updated address information, which may be provided to the user for verification. Alternatively, the system assumes that the stored address details are accurate and does not prompt the user for any input.

At step 2104, secondary address information is retrieved from the address database 122. This information may include details about the property, such as property type, size, address history, house plan, census data, ownership information, and so on. The primary and secondary address information is analyzed in the next step, step 2106. The analyzer 1710 can compare the primary address information with information regarding the geographical area serviced by a service provider to determine availability of products or services at the user's address.

At the next step, step 2108, the available third party products and services are shortlisted (i.e., filtered) and stored along with the address details. In one embodiment, this shortlisted data is already available in the address database 122, and the address engine does not perform this analysis every time. Instead, the product engine 1002 may simply retrieve this information from the address database and move to the next step.

At step 2110, the calculator 1712 determines the most appropriate third party shortlisted products or services based on the secondary address information. This determination may be made by considering one or more secondary information parameters, such as house type, previous products or services installed in the property, number of rooms, and other pertinent parameters. This list of most appropriate products and services is utilized by the recommendation engine 1010 to pro vide the ranked list 160.

As mentioned previously, the outputs of each process 1900, 2000, and 2001 are used by process 1800 to suggest optimal third party products and services to users.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The specification has described a system suitable for product or service acquisition from an order facilitation service. The foregoing description of the exemplary embodiments has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the systems and their practical application so as to enable others skilled in the art to utilize the systems and various embodiments and with various modifications as are suited to the particular use contemplated. Alternative embodiments will become apparent to those skilled in the art to which the present disclosure pertains without departing from their spirit and scope. Accordingly, the scope of the present inventions is defined by the appended claims rather than the foregoing description and the exemplary embodiments described therein.

What is claimed is:

1. A computer-implemented method for offering recommendations for one or more third party products and services to a user based on a geographical location associated with the user, and based on user-related parameters and information relating to the third party products and services, comprising the steps of:
   receiving information relating to third party products and services, wherein the information relating to the third party products and services includes availability information indicative of geographic availability for each product and service, and wherein the information relating to the third party products and services includes product performance data indicative of performance results for each product and service;
   receiving one or more user-related parameters, wherein the one or more user-related parameters include preferences of the user and location information corresponding to a geographical location associated with the user;
   identifying from the third party products and services one or more eligible third party products and services available to the user by comparing the availability information for each third party product and service to the location information corresponding to the geographical location associated with the user;
   ranking the one or more eligible third party products and services based on the one or more user-related parameters and based on the information relating to the third party products and services, including the product performance data indicative of performance results for each product and service; and
   providing the user with information relating to at least one of the one or more ranked eligible third party products and services.

2. The computer-implemented method of claim 1, wherein the information relating to the third party products and services is selected from the group comprising: consumer experience information, on-going promotions or sales information, information regarding product or service plan metrics, product or service rating information, product or service popularity, product or service reviews, product or service profitability, product or service type, price, product or service details, or number of sales.

3. The computer-implemented method of claim 1, wherein the step of ranking further comprises the steps of:
   retrieving the information relating to the third party products and services for each eligible third party product and service;
   retrieving the one or more user-related parameters for each eligible third party product and service;
   assigning weights to the retrieved information relating to the third party products and services and user-related parameters for each eligible third party product and service;
   calculating a score for each eligible third party product and service based on the weighted information relating to the third party products and services and weighted user-related parameters, wherein the weighted information relating to the third party products and services includes weighted product performance data indicative of weighted performance results for each product and service; and
   ranking the eligible third party products and services based on the scores.

4. The computer-implemented method of claim 3, wherein the step of assigning weights to the retrieved information relating to the third party products and services, including the weighted product performance data indicative of weighted performance results for each product and service further comprises the step of using a look-up table to determine predetermined weights corresponding to each or the one or more eligible third party products and services.

5. The computer-implemented method of claim 1, further comprising the steps of:
   identifying the user based on the one or more user-related parameters;
   retrieving user preferences and preference history information pertinent to the user; and
   classifying the user into one or more categories based on the one or more user-related parameters, user preferences, and preference history information.

6. The computer-implemented method of claim 5, wherein the step of identifying the user further comprises the steps of:
   receiving one or more user details selected from user name, email address, telephone number, social security number, date of birth, verification password, account number, account name, or user ID; and
   comparing the received user details with user information stored in a database.

7. The computer-implemented method of claim 5, wherein the one or more categories include a high profile customer, a low profile customer, a medium profile customer, a high value customer, a low value customer, a medium value customer, a particular age group, or a particular preference group.

8. The computer-implemented method of claim 1, wherein the one or more user-related parameters include one or more of census demographics, age of the user, user's family size, marital status of the user, census income data pertaining to the user, user's credit score, information relating to the user's current geographical location, information relating to the user's previous geographical location, specifics of the user's geographical location.

9. The computer implemented method of claim 1, wherein the location information corresponding to the geographical location of the user comprises one or more of: zip code, map coordinates, neighborhood information, address information, address history, residence plan, residence specifications, residence type, census data, ownership information.

10. The computer-implemented method of claim 1, wherein the performance results for each third party product and service comprises a conversion rate indicative of a ratio of a total number of orders placed by users for a respective third party product and service as compared to a total number of offers for the respective third party product and service.

11. The computer-implemented method of claim 1, wherein the performance results for each third party product and service comprises a completion rate indicative of a ratio of a number of actual installs for a respective third party product and service as compared to a total number of orders placed by users for the respective third party product and service.

12. The computer-implemented method of claim 1, wherein the performance results for each third party product and service comprises a payment rate indicative of a ratio of a total number of actual payments received from users for a respective third party product and service as compared to a total number of orders placed by users for the respective third party product and service.

13. The computer-implemented method of claim 1, wherein the performance results for each third party product and service comprises a growth rate indicative of an incremental difference in number of orders placed for a respective third party product and service over a defined time period as compared to a total number of orders placed for the respective third party product and service over an earlier defined time period.

14. The computer-implemented method of claim 1, wherein the product performance data includes a gross revenue associated with each third party product and service.

15. The computer-implemented method of claim 1, wherein the performance results for each third party product and service comprises user reviews indicative of consumer experiences of users for each respective third party product and service.

16. The computer-implemented method of claim 1, wherein the information relating to the third party products and services is received from each respective service provider in real time.

17. The method of claim 1, wherein the information relating to the third party products and services is received from external sources that are separate from respective service providers.

18. The method of claim 1, further comprising the steps of:
retrieving additional product performance data indicative of additional performance results of previously ranked one or more eligible third party products and services;
re-ranking the one or more eligible third party products and services based on the retrieved additional product performance data indicative of additional performance results, one or more user-related parameters, and the information relating to the third party products and services; and
providing the user with updated information relating to at least one of the one or more re-ranked eligible third party products and services.

19. The method of claim 1, wherein availability information indicative of geographic availability includes secondary address information relating to physical characteristics of a property corresponding to the geographical location associated with the user.

20. The method of claim 19, wherein the secondary address information is selected from the group comprising: a property type, a property plan, a property size, number of rooms in the property, previous products or services installed in the property, census data pertaining to ownership and resident information for the property, capability data corresponding to products or services deliverable at the property.

21. The method of claim 1, wherein the step of ranking the one or more eligible third party products and services further comprises the steps of:
retrieving historical information in connection with at least one of the one or more ranked eligible third party products and services corresponding to a previous ranking step;
re-ranking the one or more eligible third party products and services based on the retrieved historical information; and
providing the user with updated information relating to at least one of the one or more re-ranked eligible third party products and services.

22. A system for offering recommendations to a user for one or more third party products and services based on a geographical location associated with the user and based on availability information indicative of geographic availability for each product and service, the system comprising:
an electronic database for storing (a) one or more user-related parameters, and (b) information relating to third party products and services, wherein the information relating to the third party products and services includes availability information indicative of geographic availability for each product and service, and wherein the information relating to the third party products and services includes product performance data indicative of performance results for each product and service;
a processor communicably coupled to the electronic database, wherein the processor performs the steps of:
generating a user profile based on the one or more user-related parameters including preferences of the user and location information corresponding to a geographical location associated with the user;
determining one or more third party products and services eligible for the user by comparing availability information for each third party product and service to the location information corresponding to the geographical location associated with the user;
ranking the one or more eligible third party products and services based on the one or more user-related parameters and based on the information relating to the third party products and services, including the product performance data indicative of performance results for each product and service; and
providing the user with information relating to at least one of the one or more ranked eligible third party products and services.

23. The system of claim 22, wherein the information relating to third party products and services is selected from the group comprising: consumer experience information, on-going promotions or sales information, information regarding product or service plan metrics, product or service rating information, product or service popularity, product or service reviews, product or service profitability, product or service type, price, product or service details, or number of sales.

24. The system of claim 22, wherein the ranking step performed by the processor includes the additional steps of:
retrieving from the electronic database, the one or more user-related parameters and the information relating to the third party products and services for each eligible third party product and service;
assigning weights to the retrieved one or more user-related parameters and the information relating to the third party products and services for each eligible third party product and service;
calculating a score for each eligible third party product and service based on the weighted one or more user-related parameters and the weighted information relating to the third party products and services, wherein the weighted information relating to the third party products and services includes weighted product performance data indicative of weighted performance results for each product and service; and
ranking the eligible third party products and services based on the scores.

25. The system or claim 24, wherein the weights assigned to the retrieved one or more user-related parameters and the information relating to third party products and services, including the product performance data indicative of performance results for each product and service are determined by accessing a predetermined look-up table stored in the electronic database.

26. The system of claim 22, wherein the processor performs the additional steps of:
identifying the user;
receiving one or more third party product and service preferences from the user;

retrieving user information and preference history information pertinent to the user from the electronic database; and classifying the user into one or more categories based on the third party product and service preferences, user information, and preference history information.

27. The system of claim 26, wherein the processor performs the additional steps of identifying the user by:

receiving one or more user details selected from user name, email address, telephone number, social security number, date of birth, password, account number, account name, or user ID; and comparing the received user details with user information stored in the electronic database.

28. The system of claim 26, wherein the one or more categories include a high profile customer, a low profile customer, a medium profile customer, a high value customer, a low value customer, a medium value customer, a particular age group, or a particular preference group.

29. The system of claim 22, wherein the one or more user-related parameters are selected from the group comprising: census demographics, age of the user, user's family size, marital status of the user, census income data pertaining to the user, user's credit score, information relating to the user's current geographical location, information relating to the users previous geographical location, specifics of the user's geographical location.

30. The system of claim 22, wherein the location information corresponding to a geographical location associated with the user comprises one or more of: zip code, map coordinates, neighborhood information, address information, address history, residence plan, residence specifications, residence type, census data, ownership information.

31. In a system for facilitating purchase by users of third party products and services offered by one or more third party product and service providers, wherein the third party products and services are offered to geographical locations associated with the users, a method for identifying optimal third party products and services for a user, comprising the steps of:

receiving product/service information corresponding to a plurality of products/services offered by the one or more third party product and service providers, wherein the product/service information includes availability information indicative of geographic availability for each product and service, and wherein the product/service information includes product performance data indicative of performance results for each product/service;

receiving location information corresponding to a geographical location associated with the user;

identifying from the plurality of products/services one or more eligible third party products/services available to the user by comparing the availability information for each third party product and service to the location information corresponding to the geographical location associated with the user;

standardizing the product/service information for the one or more eligible third party products/services based on one or more predefined rules;

assigning a predefined weight to each of the standardized one or more eligible third party products/services that comprise the standardized product/service information, wherein the predetermined weight takes into account the performance data indicative of performance results for each product/service;

calculating a composite score for each eligible third party product/service offered by the one or more third party product and service providers based on the standardized product/service information and predefined weights associated with each of the one or more eligible third party product/service; and generating one or more product/service recommendations for the user based on the composite score for each of the one or more eligible third party product/service according to a predefined ranking scheme, whereby the one or more product/service recommendations are used to suggest one or more products or services to the user that best fit me user's needs.

* * * * *